United States Patent
Gong et al.

(10) Patent No.: US 10,327,240 B2
(45) Date of Patent: Jun. 18, 2019

(54) METHOD FOR TRANSMITTING SYNCHRONIZATION CHANNEL SCH AND RELATED DEVICE

(71) Applicant: Huawei Technologies Co., Ltd., Shenzhen (CN)

(72) Inventors: Zhengwei Gong, Shanghai (CN); Jiehua Xiao, Shanghai (CN); Rentian Ding, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 15/420,765

(22) Filed: Jan. 31, 2017

(65) Prior Publication Data
US 2017/0142718 A1     May 18, 2017

Related U.S. Application Data

(63) Continuation of application No. PCT/CN2014/083448, filed on Jul. 31, 2014.

(51) Int. Cl.
| | | |
|---|---|---|
| H04W 72/04 | (2009.01) | |
| H04W 56/00 | (2009.01) | |
| H04B 1/7183 | (2011.01) | |

(52) U.S. Cl.
CPC ...... *H04W 72/0446* (2013.01); *H04B 1/7183* (2013.01); *H04W 56/001* (2013.01); *H04W 72/042* (2013.01)

(58) Field of Classification Search
CPC .......... H04W 72/042; H04W 72/0446; H04W 72/04; H04W 56/00; H04W 56/001; H04W 56/002; H04W 74/0891; H04B 1/7183; H04B 1/7156; H04B 7/195; H04B 7/2048; H04B 7/212; H04B 7/2125; H04B 7/2662;
(Continued)

(56) References Cited

U.S. PATENT DOCUMENTS

| | | | |
|---|---|---|---|
| 6,256,486 B1 | 7/2001 | Barany et al. | |
| 8,406,789 B1 | 3/2013 | Thompson | |

(Continued)

FOREIGN PATENT DOCUMENTS

| | | |
|---|---|---|
| CN | 1207218 A | 2/1999 |
| CN | 1988414 A | 6/2007 |
| WO | WO 2008157026 A1 | 12/2008 |

*Primary Examiner* — Hoang-Chuong Q Vu
(74) *Attorney, Agent, or Firm* — Leydig, Voit & Mayer, Ltd.

(57) ABSTRACT

Disclosed are a method for transmitting a synchronization channel SCH and a related device. The method include: configuring at least two SCH resources on a first common control channel and an extended control channel of a synchronization transmission period, where the synchronization transmission period includes 10 or 11 Time Division Multiple Access TDMA frames, each TDMA frame includes a total of 8 timeslots from timeslot 0 to timeslot 7, the first common control channel is timeslot 0, the extended control channel does not include timeslot 0, and each SCH resource is a timeslot of a TDMA frame; and transmitting at least two pieces of SCH information on the configured at least two SCH resources, where one piece of SCH information is transmitted on each SCH resource, and the at least two pieces of SCH information include same frame number information.

18 Claims, 7 Drawing Sheets

(58) Field of Classification Search
CPC ... H04B 7/2671; H04B 7/2678; H04B 7/2681
See application file for complete search history.

(56) References Cited

U.S. PATENT DOCUMENTS

| | | | |
|---|---|---|---|
| 9,277,521 B2* | 3/2016 | Das | H04W 56/0085 |
| 2002/0150074 A1* | 10/2002 | Hayashi | H04B 7/2643 |
| | | | 370/342 |
| 2008/0233988 A1* | 9/2008 | Yang | H04W 56/00 |
| | | | 455/515 |
| 2008/0316961 A1 | 12/2008 | Bertrand et al. | |
| 2009/0046629 A1 | 2/2009 | Jiang et al. | |
| 2011/0182329 A1 | 7/2011 | Wehinger | |
| 2012/0140709 A1 | 6/2012 | Hou | |
| 2013/0322313 A1 | 12/2013 | Sikri et al. | |
| 2013/0322328 A1* | 12/2013 | Sikri | H04W 56/0015 |
| | | | 370/328 |
| 2014/0071976 A1 | 3/2014 | Anand et al. | |
| 2014/0119343 A1* | 5/2014 | Chin | H04W 68/12 |
| | | | 370/335 |
| 2014/0335873 A1* | 11/2014 | Yu | H04W 72/0453 |
| | | | 455/450 |
| 2015/0341884 A1* | 11/2015 | Das | H04W 56/0035 |
| | | | 370/311 |
| 2016/0262089 A1* | 9/2016 | Das | H04W 36/0088 |

\* cited by examiner

| BCH + CCCH | 0 | 1 | 2 | 3 | 4 | 5 | 6 | 7 | 8 | 9 | 10 | 11 | 12 | 13 | 14 | 15 | 16 | 17 | 18 | 19 | ... | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|---|---|---|---|---|---|---|
| TN0 | F | S | | | BCCH norm | | BCCH Ext. PAGCH0 | | | F | S | | PAGCH1 | | | | PAGCH2 | | | | ... | F | S | | PAGCH7 | | | | PAGCH8 | | | — |
| TN1 | | | | | | | | | | | | | | | | | | | | | | | | | | | | | | | | |
| TN2 | | | | | BCCH norm | | BCCH Ext. PAGCH0 | | | | | | PAGCH1 | | | | PAGCH2 | | | | | | | | PAGCH7 | | | | PAGCH8 | | | — |
| TN3 | | | | | | | | | | | | | | | | | | | | | | | | | | | | | | | | |
| TN4 | | | | | BCCH norm | | BCCH Ext. PAGCH0 | | | | | | PAGCH1 | | | | PAGCH2 | | | | | | | | PAGCH7 | | | | PAGCH8 | | | — |
| TN5 | | | | | | | | | | | | | | | | | | | | | | | | | | | | | | | | |
| TN6 | | | | | BCCH norm | | BCCH Ext. PAGCH0 | | | | | | PAGCH1 | | | | PAGCH2 | | | | | | | | PAGCH7 | | | | PAGCH8 | | | — |
| TN7 | | | | | | | | | | | | | | | | | | | | | | | | | | | | | | | | |

FIG. 1

METHOD FOR TRANSMITTING SYNCHRONIZATION CHANNEL SCH AND RELATED DEVICE

CROSS-REFERENCE TO RELATED APPLICATIONS

This application is a continuation of International Patent Application No. PCT/CN2014/083448, filed Jul. 31, 2014, the disclosure of which is hereby incorporated by reference in its entirety.

TECHNICAL FIELD

The present application relates to the field of communications technologies, and in particular, to a method for transmitting a synchronization channel SCH and a related device.

BACKGROUND

Coverage is an important feature for measuring a communications system. Coverage represents a maximum coverage area in which a user can obtain a service (properly receiving and transmitting data according to a specific proportion). In a communication transmission process, a signal transmitted by a transmit end experiences various fading and losses, together with interference and noise before reaching a receive end. A longer transmission distance indicates higher signal attenuation, which degrades coverage performance. Good coverage performance may help reduce base station construction costs, reduce maintenance costs, and increase access users. Therefore, coverage enhancement has always been a research focus.

Downlink synchronization is the first step for a base station to establish a communications connection to a terminal. In an existing GSM (Global system for mobile communications) system, two channels are required to perform downlink synchronization: an FCCH frequency correction channel) and an SCH (synchronization channel), where a main function of the FCCH is to perform frequency synchronization. The second step is to implement time domain synchronization by using an SCH channel, so as to complete a whole synchronization process. However, in the existing GSM system, the FCCH and the SCH can be transmitted only in a first timeslot, and an FCCH and an SCH are transmitted once at specific time intervals. Consequently, a synchronization channel of the existing GSM system can hardly meet a requirement for enhancing coverage by 20 dB.

SUMMARY

Embodiments of the present application provide a method for transmitting a synchronization channel SCH and a related device, so as to meet a high requirement for coverage enhancement by repeatedly transmitting SCH information.

A first aspect of the present application provides a base station, including:

a first processing unit, adapted to configure at least two synchronization channel SCH resources on a first common control channel and an extended control channel of a synchronization transmission period, where the synchronization transmission period includes 10 or 11 Time Division Multiple Access TDMA frames, each TDMA frame includes a total of 8 timeslots from timeslot 0 to timeslot 7, the first common control channel is timeslot 0, the extended control channel does not include timeslot 0, and each SCH resource is a timeslot of a TDMA frame; and a first sending unit, configured to transmit at least two pieces of SCH information on the configured at least two SCH resources, where one piece of SCH information is transmitted on each SCH resource, and the at least two pieces of SCH information include same frame number information.

In a first possible implementation manner,
the extended control channel is a common control channel, and the extended control channel is one or more of timeslot 2, timeslot 4, or timeslot 6; and
the at least two SCH resources configured by the first processing unit are timeslot 0 of a second TDMA frame of the synchronization transmission period and one or more of timeslot 2, timeslot 4, or timeslot 6 of the second TDMA frame of the synchronization transmission period.

With reference to the first aspect, in a second possible implementation manner,
the extended control channel is a common control channel, and the extended control channel is one or more of timeslot 2, timeslot 4, or timeslot 6; and
the at least two SCH resources configured by the first processing unit are timeslot 0 of a second TDMA frame of the synchronization transmission period and one or more of timeslot 2, timeslot 4, or timeslot 6 of a first TDM frame and the second TDMA frame of the synchronization transmission period.

With reference to the first possible implementation manner of the first aspect or the second possible implementation manner of the first aspect, in a third possible implementation manner,
the at least two SCH resources configured by the first processing unit further include: timeslot 1, timeslot 3, timeslot 5, or timeslot 7 of at least one TDMA frame of the synchronization transmission period.

With reference to the first aspect, in a fourth possible implementation manner,
the extended control channel is a non-common control channel, and the extended control channel is one or more of timeslot 1 to timeslot 7; and
the at least two SCH resources configured by the first processing unit include: timeslot 0 of a second TDMA frame of the synchronization transmission period and any one of timeslot 1 to timeslot 7 of at least one TDMA frame of the synchronization transmission period.

With reference to the first aspect, in a fifth possible implementation manner, the base station further includes:
a second processing unit, adapted to configure at least two frequency correction channel FCCH resources on the first common control channel and the extended control channel of the synchronization transmission period, where the FCCH resource is a timeslot of a TDMA frame; and
a second sending unit, configured to transmit at least two pieces of FCCH information on the configured at least two FCCH resources; where
the first sending unit includes:
a coding subunit, configured to perform coding on SCH information according to a timeslot number of an SCH resource; and
a sending subunit, configured to transmit coded SCH information, where the coded SCH information includes timeslot number information approximately the SCH resource.

With reference to the fifth possible implementation manner of the first aspect, in a sixth possible implementation manner, the coding subunit is specifically configured to determine a mask of a timeslot number, and perform an exclusive OR operation on the mask of the timeslot number and a cyclic redundancy check code of the SCH information; where masks of different timeslot numbers are different from each other.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, the first processing unit is specifically configured to determine the at least two SCH resources according to a default configuration.

A second aspect of the present application provides user equipment, including:

a first receiving unit, configured to receive at least two pieces of SCH information in a synchronization transmission period of a base station after frequency correction is completed by using received FCCH information; and a demodulation unit, configured to demodulate the received at least two pieces of SCH information; where the synchronization transmission period includes 10 or 11 TDMA frames, and each TDMA frame includes a total of 8 timeslots from timeslot 0 to timeslot 7; and the received at least two pieces of SCH information are transmitted by the base station on a first common control channel and an extended control channel of the synchronization transmission period, the first common control channel is timeslot 0, and the extended control channel does not include timeslot 0.

In a first possible implementation manner, the user equipment further includes:

a second receiving unit, configured to receive at least two pieces of FCCH information in the synchronization transmission period of the base station, and perform frequency correction by using the at least two pieces of FCCH information; where the first receiving unit includes:

a receiving subunit, configured to receive at least two pieces of coded SCH information in the synchronization transmission period of the base station after completing frequency correction by using the received FCCH information; and a decoding subunit, configured to decode the received at least two pieces of coded SCH information, where the at least two pieces of coded SCH information are obtained by using the base station to perform coding on the SCH information according to the timeslot number of the configured SCH resource; where the demodulation unit is specifically configured to demodulate the decoded at least two pieces of coded SCH information.

A third aspect of the present application provides a method for transmitting a synchronization channel SCH, including:

configuring at least two SCH resources on a first common control channel and an extended control channel of a synchronization transmission period, where the synchronization transmission period includes 10 or 11 Time Division Multiple Access TDMA frames, each TDMA frame includes a total of 8 timeslots from timeslot 0 to timeslot 7, the first common control channel is timeslot 0, the extended control channel does not include timeslot 0, and each SCH resource is a timeslot of a TDMA frame; and transmitting at least two pieces of SCH information on the configured at least two SCH resources, where one piece of SCH information is transmitted on each SCH resource, and the at least two pieces of SCH information include same frame number information.

In a first possible implementation manner, the extended control channel is a common control channel, and the extended control channel is one or more of timeslot 2, timeslot 4, or timeslot 6; and the configured at least two SCH resources are timeslot 0 of a second TDMA frame of the synchronization transmission period and one or more of timeslot 2, timeslot 4, or timeslot 6 of the second TDMA frame of the synchronization transmission period.

With reference to the third aspect, in a second possible implementation manner, the extended control channel is a common control channel, and the extended control channel is one or more of timeslot 2, timeslot 4, or timeslot 6; and the configured at least two SCH resources are timeslot 0 of a second TDMA frame of the synchronization transmission period and one or more of timeslot 2, timeslot 4, or timeslot 6 of a first TDM frame and the second TDMA frame of the synchronization transmission period.

With reference to the first possible implementation manner of the third aspect or the second possible implementation manner of the third aspect, in a third possible implementation manner, the configured at least two SCH resources further include: timeslot 1, timeslot 3, timeslot 5, or timeslot 7 of at least one TDMA frame of the synchronization transmission period.

With reference to the third aspect, in a fourth possible implementation manner, the extended control channel is a non-common control channel, and the extended control channel is one or more of timeslot 1 to timeslot 7; and the configured at least two SCH resources include: timeslot 0 of a second TDMA frame of the synchronization transmission period and any one of timeslot 1 to timeslot 7 of at least one TDMA frame of the synchronization transmission period.

With reference to the third aspect, in a fifth possible implementation manner, the method further includes:

configuring at least two frequency correction channel FCCH resources on the first common control channel and the extended control channel of the synchronization transmission period, where the FCCH resource is a timeslot of a TDMA frame; and transmitting at least two pieces of FCCH information on the configured at least two FCCH resources; where the transmitting at least two pieces of SCH information on the configured at least two SCH resources includes:

performing coding on the SCH information according to a timeslot number of the SCH resource, and transmitting coded SCH information, where the coded SCH information includes timeslot number information approximately the SCH resource.

With reference to the fifth possible implementation manner of the third aspect, in a sixth possible implementation manner, the performing coding on the SCH information according to a timeslot number of the SCH resource includes:

determining a mask of the timeslot number, where masks of different timeslot numbers are different from each other; and performing an exclusive OR operation on the mask of the timeslot number and a cyclic redundancy check code of the SCH information.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a seventh possible implementation manner, the configuring at least two SCH resources on a first common control channel and an extended control channel of a synchronization transmission period includes:

determining the at least two SCH resources according to a default configuration.

A fourth aspect of the present application provides a method for receiving a synchronization channel SCH, including:

receiving at least two pieces of SCH information in a synchronization transmission period of a base station after frequency correction is completed by using received FCCH information; and demodulating the received at least two pieces of SCH information; where the synchronization transmission period includes 10 or 11 TDMA frames, and each TDMA frame includes a total of 8 timeslots from timeslot 0 to timeslot 7; and the received at least two pieces of SCH information are transmitted by the base station on a first common control channel and an extended control channel of the synchronization transmission period, the first common control channel is timeslot 0, and the extended control channel does not include timeslot 0.

In a first possible implementation manner, the method further includes:

receiving at least two pieces of FCCH information in the synchronization transmission period of the base station, and performing frequency correction by using the at least two pieces of FCCH information; where the receiving at least two pieces of SCH information in a synchronization transmission period of a base station after frequency correction is completed by using received FCCH information includes:

receiving at least two pieces of coded SCH information in the synchronization transmission period of the base station after frequency correction is completed by using the received FCCH information; and decoding the received at least two pieces of coded SCH information, where the at least two pieces of coded SCH information are obtained by using the base station to perform coding on the SCH information according to the timeslot number of the configured SCH resource; where the demodulating the received at least two pieces of SCH information specifically includes: demodulating the decoded at least two pieces of coded SCH information.

A fifth aspect of the present application provides a computer storage medium, where the computer storage medium may store a program, and when being executed, the program includes all or some of the steps in the method for transmitting a synchronization channel SCH provided in the third aspect.

A sixth aspect of the present application provides a computer storage medium, where the computer storage medium may store a program, and when being executed, the program includes all or some of the steps in the method for receiving a synchronization channel SCH provided in the fourth aspect.

A seventh aspect of the present application provides a base station, including: a processor, a communications interface, and a memory, where the communications interface is configured to communicate with user equipment;

the memory is configured to store a program; and the processor is configured to execute the program, so as to implement:

configuring at least two SCH resources on a first common control channel and an extended control channel of a synchronization transmission period, where the synchronization transmission period includes 10 or 11 Time Division Multiple Access TDMA frames, each TDMA frame includes a total of 8 timeslots from timeslot 0 to timeslot 7, the first common control channel is timeslot 0, the extended control channel does not include timeslot 0, and each SCH resource is a timeslot of a TDMA frame; and transmitting at least two pieces of SCH information on the configured at least two SCH resources, where one piece of SCH information is transmitted on each SCH resource, and the at least two pieces of SCH information include same frame number information.

In a first possible implementation manner, the extended control channel is a common control channel, and the extended control channel is one or more of timeslot 2, timeslot 4, or timeslot 6; and the configured at least two SCH resources are timeslot 0 of a second TDMA frame of the synchronization transmission period and one or more of timeslot 2, timeslot 4, or timeslot 6 of the second TDMA frame of the synchronization transmission period.

With reference to the seventh aspect, in a second possible implementation manner, the extended control channel is a common control channel, and the extended control channel is one or more of timeslot 2, timeslot 4, or timeslot 6; and the configured at least two SCH resources are timeslot 0 of a second TDMA frame of the synchronization transmission period and one or more of timeslot 2, timeslot 4, or timeslot 6 of a first TDM frame and the second TDMA frame of the synchronization transmission period.

With reference to the first possible implementation manner of the seventh aspect or the second possible implementation manner of the seventh aspect, in a third possible implementation manner, the configured at least two SCH resources further include: timeslot 1, timeslot 3, timeslot 5, or timeslot 7 of at least one TDMA frame of the synchronization transmission period.

With reference to the seventh aspect, in a fourth possible implementation manner, the extended control channel is a non-common control channel, and the extended control channel is one or more of timeslot 1 to timeslot 7; and the configured at least two SCH resources include: timeslot 0 of a second TDMA frame of the synchronization transmission period and any one of timeslot 1 to timeslot 7 of at least one TDMA frame of the synchronization transmission period.

With reference to the seventh aspect, in a fifth possible implementation manner, the processor is further configured to:

configure at least two frequency correction channel FCCH resources on the first common control channel and the extended control channel of the synchronization transmission period, where the FCCH resource is a timeslot of a TDMA frame; and transmit at least two pieces of FCCH information on the configured at least two FCCH resources; where the transmitting at least two pieces of SCH information on the configured at least two SCH resources includes:

performing coding on the SCH information according to a timeslot number of the SCH resource, and transmitting coded SCH information, where the coded SCH information includes timeslot number information approximately the SCH resource.

With reference to the fifth possible implementation manner of the seventh aspect, in a sixth possible implementation manner, the processor is specifically configured to:

determine a mask of the timeslot number, where masks of different timeslot numbers are different from each other; and perform an exclusive OR operation on the mask of the timeslot number and a cyclic redundancy check code of the SCH information.

With reference to the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, or the sixth possible implementation manner of the seventh aspect, in a seventh possible implementation manner, the processor is specifically configured to:

determine the at least two SCH resources according to a default configuration.

An eighth aspect of the present application provides user equipment, including: a processor, a communications interface, and a memory, where the communications interface is configured to communicate with a base station;

the memory is configured to store a program; and the processor is configured to execute the program, so as to implement:

receiving at least two pieces of SCH information in a synchronization transmission period of the base station after frequency correction is completed by using received FCCH information; and demodulating the received at least two pieces of SCH information; where the synchronization transmission period includes 10 or 11 TDMA frames, and each TDMA frame includes a total of 8 timeslots from timeslot 0 to timeslot 7; and the received at least two pieces of SCH information are transmitted by the base station on a first common control channel and an extended control channel of the synchronization transmission period, the first common control channel is timeslot 0, and the extended control channel does not include timeslot 0.

In a first possible implementation manner, the processor is further configured to:

receive at least two pieces of FCCH information in the synchronization transmission period of the base station, and perform frequency correction by using the at least two pieces of FCCH information; where the receiving at least two pieces of SCH information in a synchronization transmission period of the base station after frequency correction is completed by using received FCCH information includes:

receiving at least two pieces of coded SCH information in the synchronization transmission period of the base station after frequency correction is completed by using the received FCCH information; and decoding the received at least two pieces of coded SCH information, where the at least two pieces of coded SCH information are obtained by using the base station to perform coding on the SCH information according to the timeslot number of the configured SCH resource; where the demodulating the received at least two pieces of SCH information specifically includes: demodulating the decoded at least two pieces of coded SCH information.

In the embodiments of the present application, SCH resources are configured on a first common control channel and an extended control channel, so as to implement repeated transmission of SCH information in a synchronization transmission period, so that coverage of a synchronization channel can be enhanced.

BRIEF DESCRIPTION OF DRAWINGS

To describe the technical solutions in the embodiments of the present application or in the prior art more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 1 is a structural diagram of a 51-frame multiframe in the prior art;

DESCRIPTION OF EMBODIMENTS

Figure 2:
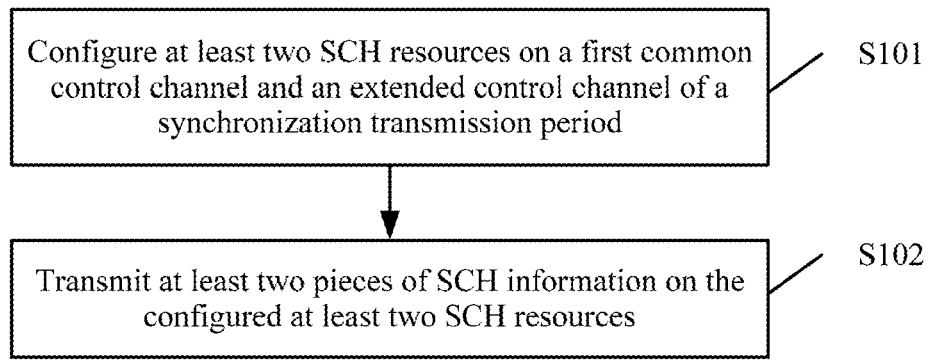
FIG. 2 is a schematic flowchart of a method for transmitting a synchronization channel SCH according to an embodiment of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

In a downlink synchronization process, a GSM system in the embodiments of the present application requires two channels: an FCCH and an SCH. That is, user equipment implements frequency and time synchronization with a base station by using FCCH information and SCH information that are transmitted by the base station. The user equipment may be a communications terminal such as an M2M (machine to machine communication, machine-to-machine communication) terminal or a mobile phone.

The base station transmits the FCCH information and the SCH information based on a 51-frame multiframe structure. One 51-frame multiframe occupies a time period of approximately 235.4 ms, and includes 51 TDMA (Time Division Multiple Access, Time Division Multiple Access) frames. The 51-frame multiframe structure may be used to carry a broadcast control channel (broadcast control channel, BCCH), a common control channel (common control channel, CCCH), and a dedicated control channel (stand-alone dedicated control channel, SDCCH). The BCCH is a channel used to broadcast common information based on each cell. The CCCH is a "point-to-multipoint" two-way control channel, and is used to transmit, in a call connection stage, control signaling and information that are required for a link connection. The SDCCH is used to transmit system signaling in a call setup process before a traffic channel is allocated. One TDMA frame occupies a time period of approximately 4.62 ms, and includes a total of 8 timeslots from timeslot 0 to timeslot 7.

A timeslot in consecutive TDMA frames in a GSM system is defined as a basic physical channel. In the present application, for brief description, it should be understood that when a timeslot location of a basic physical channel is described, that "a physical channel is timeslot 0" means that the physical channel is timeslots 0 of consecutive TDMA frames, instead of timeslot 0 of only one TDMA frame. A CCCH-CONF parameter of Control Channel Description IE in a system message 3 determines how many CCCH channels (which herein refers to a basic physical channel including a CCCH) are configured in a cell, and determines whether to combine a CCCH channel with an SDCCH channel. For example, in the following Table 1, BS_C-C_CHANS is used to specify a quantity of CCCH channels, and BS_CCCH_SDCCH_COMB is used to indicate whether to combine the CCCH channel with the SDCCH channel.

TABLE 1

| CCCH_CONF | BS_CC_CHANS | BS_CCCH_SDCCH_COMB |
|---|---|---|
| 000 | 1 | false |
| 001 | 1 | true |
| 010 | 2 | false |
| 100 | 3 | false |
| 110 | 4 | false |

The 51-frame multiframe has different structures according to different configurations of the foregoing cell, and an uplink 51-frame multiframe and a downlink 51-frame multiframe have different structures. Unless otherwise specified, the foregoing structure always refers to a structure of a downlink multiframe in this specification. Next, refer to FIG. 1. FIG. 1 is a complete 51-frame multiframe structure in the prior art. Each column in FIG. 1 is one TDMA frame, and there are a total of 51 TDMA frames. Each TDMA frame includes a total of 8 timeslots from TN0 to TN7, and CCCH_CONF corresponding to FIG. 1 is "110" in the binary system. That is, FIG. 1 includes four CCCH channels, each CCCH channel is transmitted in the 51-frame multiframe structure, and the four CCCH channels are respectively TN0, TN2, TN4, and TN6. 51-frame multiframe structures configured according to different CCCH-CONF parameters are different, but locations of an FCCH and an SCH in TN0 multiframe structures remain unchanged, and are locations of the FCCH and the SCH shown in FIG. 1. Considering that transmission of an FCCH and transmission of an SCH are regular, herein, a transmission interval of the FCCH or the SCH is defined as a synchronization transmission period, and the synchronization transmission period may be considered as a transmission period of the FCCH or the SCH. Because a multiframe has an Idle frame (null frame), which is in a location marked with "-" in the 51-frame multiframe structure in FIG. 1, a synchronization transmission period may be 10 TDMA frames or 11 TDMA frames. In an existing 51-frame multiframe structure, a base station transmits FCCH information and SCH information once at intervals of a synchronization transmission period; that is, the base station transmits FCCH information and SCH information in the first two TDMA frames of TN0 of each synchronization transmission period. In the present application, all mentioned synchronization transmission periods are the synchronization transmission period defined in the embodiment corresponding to FIG. 1.

A carrier (a 200 KHz frequency band in a GSM system is referred to as a carrier) that is used to carry synchronization information and a BCCH channel is referred to as a BCCH carrier. FCCH information and SCH information in an existing GSM system are transmitted only on a BCCH carrier.

A specific transmission process of a base station in the prior art may be as follows: The base station transmits synchronization information and broadcast information in a sequence on a BCCH carrier by using a multiframe structure, and transmits FCCH information and SCH information only once in one synchronization transmission period.

A specific receiving process of user equipment in the prior art may be as follows: The user equipment searches for a BCCH carrier in a supported frequency band range by searching FCCH information, performs frequency correction by using the FCCH information after determining the BCCH carrier, and further receives and demodulates SCH information after completing the frequency correction; and performs time synchronization by using the SCH information, and then performs all communication processes with a base station according to a synchronized frequency and time. The user equipment receives FCCH information and SCH information only once in one synchronization transmission period of the base station.

Refer to FIG. 2, which is a schematic flowchart of a method for transmitting a synchronization channel SCH according to an embodiment of the present application, where the method may be performed by a base station. The method may include:

S101. Configure at least two SCH resources on a first common control channel and an extended control channel of a synchronization transmission period.

Specifically, the synchronization transmission period is an interval at which an FCCH or an SCH is transmitted in a 51-frame multiframe structure. Herein, the synchronization transmission period may be the synchronization transmission period defined in the 51-frame multiframe structural diagram provided in the foregoing FIG. 1; that is, the synchronization transmission period includes 10 or 11 TDMA frames, and each TDMA frame includes a total of 8 timeslots from timeslot 0 to timeslot 7. The first common control channel is timeslot 0, the extended control channel does not include timeslot 0, and the extended control channel is used to configure an SCH resource that needs to be repeatedly transmitted; each SCH resource is a timeslot of a TDMA frame.

The base station may configure at least two SCH resources on the first common control channel and the extended control channel of the synchronization transmission period. The SCH resource may be configured in many manners. The following describes the configuration manners of the SCH resource in detail.

A first configuration manner is as follows: If the extended control channel is further defined as a common control channel, that is, a CCCH channel, and the extended control channel is one or more of timeslot 2, timeslot 4, or timeslot 6, the configured at least two SCH resources are timeslot 0 of a second TDMA frame of the synchronization transmission period and one or more of timeslot 2, timeslot 4, or timeslot 6 of the second TDMA frame of the synchronization transmission period.

Specifically, each described resource used to enhance synchronization coverage in the present application is configured on a BCCH carrier (which is not described in the following again). The first configuration manner is applicable to a case in which SCH information needs to be repeatedly transmitted 2 to 4 times, and a sum of a first common control channel and an extended control channel in a base station needs to be greater than or equal to required transmission times of the SCH information. The required transmission times of the SCH information are determined according to a requirement of a coverage level. For description, refer to the following Table 2.

remains the same as that defined in an existing protocol, at least one SCH resource is configured only in TN1 to TN7, and SCH information is transmitted on the configured SCH resource, so as to improve coverage performance of a synchronization signal. In the prior art, if a CCCH channel is configured in one or more timeslots in TN2, TN4, and TN6, no information is transmitted in the first two TDMA frames corresponding to the CCCH channel. Therefore, in this embodiment of the present application, SCH information that needs to be repeatedly transmitted may be preferentially configured on one or more CCCH channels in TN2, TN4, and TN6. In this way, a time-frequency resource on which a channel is configured can be fully used, which improves resource utilization; in addition, repeated transmission of SCH information is implemented in one TDMA frame, which reduces synchronization duration of user equipment. Frame number information carried in each piece of SCH information that is repeatedly transmitted in TN1 to TN7 is always the same as frame number information carried in SCH information in TN0, so that user equipment can combine received multiple SCHs for decoding.

A second configuration manner is as follows: If the extended control channel is further defined as a common control channel, and the extended control channel is one or more of timeslot 2, timeslot 4, or timeslot 6, the configured at least two SCH resources are timeslot 0 of a second TDMA frame of the synchronization transmission period and one or more of timeslot 2, timeslot 4, or timeslot 6 of a first TDM frame and the second TDMA frame of the synchronization transmission period.

Specifically, the second configuration manner is applicable to a case in which SCH information needs to be repeatedly transmitted 2 to 7 times, and twice of a sum of a first common control channel and an extended control channel in a base station needs to be greater than required transmission times of the SCH information. For description, refer to the following Table 3.

TABLE 2

| | TDMA frame number | | | | | | | | | |
|---|---|---|---|---|---|---|---|---|---|---|
| | 0 | 1 | 2 | 3 | 4 | 5 | 6 | 7 | 8 | 9 |
| DOWNLINK TN0 | F | S | | BCCH norm | | | BCCH Ext, PAGCH | | | |
| DOWNLINK TN1 | | | | | | | | | | |
| DOWNLINK TN2 | | S | | BCCH norm | | | BCCH Ext, PAGCH | | | |
| DOWNLINK TN3 | | | | | | | | | | |
| DOWNLINK TN4 | | S | | BCCH norm | | | BCCH Ext, PAGCH | | | |
| DOWNLINK TN5 | | | | | | | | | | |
| DOWNLINK TN6 | | S | | BCCH norm | | | BCCH Ext, PAGCH | | | |
| DOWNLINK TN7 | | | | | | | | | | |

Table 2 shows a synchronization transmission period in TDMA frame 0 to TDMA frame 9 in a 51-frame multiframe structure, which includes 10 TDMA frames. F represents an FCCH, S represents an SCH, and TN0 to TN7 represent a total of 8 timeslots from timeslot 0 to timeslot 7. Each column represents one TDMA frame, and one TDMA frame includes 8 timeslots. Table 2 shows a case in which four CCCH channels are configured in the cell. Herein, TN0 is referred to as a first common control channel; TN2, TN4, and TN6 are referred to as extended control channels; and other timeslots may be configured as traffic channels. In Table 2, four SCH resources are configured on the first common control channel and the extended control channels. After the four SCH resources are configured, the base station may transmit four pieces of SCH information on the configured four SCH resources. In this embodiment of the present application, a multiframe structure of a TN0 timeslot

TABLE 3

| | TDMA frame number | | | | | | | | | |
|---|---|---|---|---|---|---|---|---|---|---|
| | 0 | 1 | 2 | 3 | 4 | 5 | 6 | 7 | 8 | 9 |
| DOWNLINK TN0 | F | S | | BCCH norm | | | BCCH Ext, PAGCH | | | |
| DOWNLINK TN1 | | | | | | | | | | |
| DOWNLINK TN2 | S | S | | BCCH norm | | | BCCH Ext, PAGCH | | | |
| DOWNLINK TN3 | | | | | | | | | | |
| DOWNLINK TN4 | S | S | | BCCH norm | | | BCCH Ext, PAGCH | | | |
| DOWNLINK TN5 | | | | | | | | | | |
| DOWNLINK TN6 | S | S | | BCCH norm | | | BCCH Ext, PAGCH | | | |
| DOWNLINK TN7 | | | | | | | | | | |

Table 3 shows a synchronization transmission period in TDMA frame 0 to TDMA frame 9 in a 51-frame multiframe structure, which includes 10 TDMA frames. F represents an FCCH, S represents an SCH, and TN0 to TN7 represent a total of 8 timeslots from timeslot 0 to timeslot 7. Each column represents one TDMA frame, and one TDMA frame includes 8 timeslots. Table 3 shows a case in which four CCCH channels are configured in the cell. Herein, TN0 is referred to as a first common control channel; TN2, TN4, and TN6 are referred to as extended control channels; and other timeslots may be configured as traffic channels. In Table 3, seven SCH resources are configured on the first common control channel and the extended control channels. After the seven SCH resources are configured, the base station may transmit seven pieces of SCH information on the configured seven SCH resources. In this embodiment of the present application, a multiframe structure of a TN0 timeslot remains the same as that defined in an existing protocol, at least one SCH resource is configured only in TN1 to TN7, and SCH information is transmitted on the configured SCH resource, so as to improve coverage performance of a synchronization signal. In the prior art, if a CCCH channel is configured in one or more timeslots in TN2, TN4, and TN6, no information is transmitted in the first two TDMA frames corresponding to the CCCH channel. Therefore, in this embodiment of the present application, SCH information that needs to be repeatedly transmitted may be preferentially configured on one or more CCCH channels in TN2, TN4, and TN6. In this way, a time-frequency resource on which a channel is configured can be fully used, which improves resource utilization; in addition, repeated transmission of SCH information is implemented in one TDMA frame, which reduces synchronization duration of user equipment. Frame number information carried in each piece of SCH information that is repeatedly transmitted in TN1 to TN7 is always the same as frame number information carried in SCH information in TN0, so that user equipment can combine received multiple SCHs for decoding.

Certainly, for the first configuration manner and the second configuration manner, the configured at least two SCH resources further include: timeslot 1, timeslot 3, timeslot 5, or timeslot 7 of at least one TDMA frame of the synchronization transmission period. For example, when the SCH information in Table 3 needs to be transmitted more than seven times, multiple pieces of SCH information may continue to be configured in fewest possible timeslots in TN1, TN3, TN5, or TN7 in Table 3, so as to meet required transmission times of the SCH information. For description, refer to the following Table 4.

TABLE 4

| | TDMA frame number | | | | | | | | | |
|---|---|---|---|---|---|---|---|---|---|---|
| | 0 | 1 | 2 | 3 | 4 | 5 | 6 | 7 | 8 | 9 |
| DOWNLINK TN0 | F | S | | BCCH norm | | | BCCH Ext, PAGCH | | | |
| DOWNLINK TN1 | S | S | S | S | S | S | | | | |
| DOWNLINK TN2 | S | S | | BCCH norm | | | BCCH Ext, PAGCH | | | |
| DOWNLINK TN3 | | | | | | | | | | |
| DOWNLINK TN4 | S | S | | BCCH norm | | | BCCH Ext, PAGCH | | | |
| DOWNLINK TN5 | | | | | | | | | | |
| DOWNLINK TN6 | S | S | | BCCH norm | | | BCCH Ext, PAGCH | | | |
| DOWNLINK TN7 | | | | | | | | | | |

Table 4 shows a synchronization transmission period in TDMA frame 0 to TDMA frame 9 in a 51-frame multiframe structure, which includes 10 TDMA frames. F represents an FCCH, S represents an SCH, and TN0 to TN7 represent a total of 8 timeslots from timeslot 0 to timeslot 7. Each column represents one TDMA frame, and one TDMA frame includes 8 timeslots. Table 4 shows a case in which four CCCH channels are configured in the cell. Herein, TN0 is referred to as a first common control channel; TN2, TN4, and TN6 are referred to as extended control channels; and other timeslots may be configured as traffic channels. In Table 4, 13 SCH resources are configured on the first common control channel, the extended control channels, and TN1. After the 13 SCH resources are configured, the base station may transmit 13 pieces of SCH information on the configured 13 SCH resources. To reserve more traffic channels for transmitting service data, all remaining parts of more than seven SCH resources may be configured on one channel; that is, six SCH resources are configured in TN1. When multiple SCH resources are configured on a channel in a synchronization transmission period, it is desirable that a quantity of remaining resources in the channel should be a multiple of four TDMA frames, so that service data information or other control information can be transmitted on the remaining resources by using a block (four consecutive timeslots in a channel are a block) as a granularity, so as to avoid a waste of a resource. In this embodiment of the present application, a multiframe structure of a TN0 timeslot remains the same as that defined in an existing protocol, at least one SCH resource is configured only in TN1 to TN7, and SCH information is transmitted on the configured SCH resource, so as to improve coverage performance of a synchronization signal. Frame number information carried in each piece of SCH information that is repeatedly transmitted in TN1 to TN7 is always the same as frame number information carried in SCH information in TN0, so that user equipment can combine received multiple SCHs for decoding. Certainly, if a quantity of configured SCH resources in Table 4 exceeds 13, multiple SCH resources may continue to be configured on another traffic channel.

A third configuration manner is as follows: If the extended control channel is further defined as a non-common control channel, and the extended control channel is one or more of timeslot 1 to timeslot 7, the configured at least two SCH resources include: timeslot 0 of a second TDMA frame of the synchronization transmission period and any one of timeslot 1 to timeslot 7 of at least one TDMA frame of the synchronization transmission period.

Specifically, the third configuration manner is applicable to a case in which none of timeslot 1 to timeslot 7 is configured as a CCCH channel. For description, refer to the following Table 5.

TABLE 5

| | TDMA frame number | | | | | | | | | |
|---|---|---|---|---|---|---|---|---|---|---|
| | 0 | 1 | 2 | 3 | 4 | 5 | 6 | 7 | 8 | 9 |
| DOWNLINK TN0 | F | S | | BCCH norm | | | BCCH Ext, PAGCH | | | |
| DOWNLINK TN1 | S | S | S | S | S | S | | | | |
| DOWNLINK TN2 | | | | | | | | | | |
| DOWNLINK TN3 | | | | | | | | | | |
| DOWNLINK TN4 | | | | | | | | | | |
| DOWNLINK TN5 | | | | | | | | | | |
| DOWNLINK TN6 | | | | | | | | | | |
| DOWNLINK TN7 | | | | | | | | | | |

Table 5 shows a synchronization transmission period in TDMA frame 0 to TDMA frame 9 in a 51-frame multiframe structure, which includes 10 TDMA frames. F represents an FCCH, S represents an SCH, and TN0 to TN7 represent a total of 8 timeslots from timeslot 0 to timeslot 7. Each column represents one TDMA frame, and one TDMA frame includes 8 timeslots. Table 5 shows a case in which one CCCH channel is configured in the cell. Herein, TN0 is referred to as a first common control channel; TN1 to TN7 are referred to as alternative extended control channels, and the extended control channels are non-common control channels, that is, before being selected as the extended control channels, TN1 to TN7 may be configured as traffic channels. In Table 5, TN1 is a selected extended control channel, and seven SCH resources are configured on the first common control channel and the extended control channels. After the seven SCH resources are configured, the base station may transmit seven pieces of SCH information on the configured seven SCH resources. To reserve more traffic channels for transmitting service data, all the six SCH resources may be configured on one extended control channel; that is, the six SCH resources are configured in TN1, so that TN2 to TN7 timeslots can be used to transmit service data. When multiple SCH resources are configured on a channel in a synchronization transmission period, it is desirable that a quantity of remaining resources in the channel should be a multiple of four TDMA frames, so that service data information or other control information can be transmitted on the remaining resources by using a block as a granularity, so as to avoid a waste of a resource. In this embodiment of the present application, a multiframe structure of a TN0 timeslot remains the same as that defined in an existing protocol, at least one SCH resource is configured only in TN1 to TN7, and SCH information is transmitted on the configured SCH resource, so as to improve coverage performance of a synchronization signal. Frame number information carried in each piece of SCH information that is repeatedly transmitted in TN1 to TN7 is always the same as frame number information carried in SCH information in TN0, so that user equipment can combine received multiple SCHs for decoding. Certainly, if more SCH resources need to be configured in Table 5, multiple SCH resources may continue to be configured on another traffic channel.

S102. Transmit at least two pieces of SCH information on the configured at least two SCH resources.

Specifically, one piece of SCH information is transmitted on each SCH resource, and the at least two pieces of SCH information include same frame number information; that is, frame number information carried in each piece of SCH information that is repeatedly transmitted in timeslot 1 to timeslot 7 is always the same as frame number information carried in SCH information in timeslot 0, so that user equipment can combine received multiple SCHs for decoding. After the SCH information is configured, the base station may transmit at least two pieces of SCH information on the configured at least two SCH resources. Using Table 3 in step S101 as an example, in Table 3, the base station configures a total of seven SCH resources in the first two TDMA frames of the first common control channel and the extended control channel, and therefore the base station may start to transmit SCH information from TDMA frame 0 according to the chronological order in Table 3, and then transmit SCH information in TDMA frame 1.

In this embodiment of the present application, that at least two SCH resources are configured on a first common control channel and an extended control channel of the synchronization transmission period may specifically include: determining the at least two SCH resources according to a default configuration.

In this embodiment of the present application, SCH resources are configured on a first common control channel and an extended control channel, so as to implement repeated transmission of SCH information in a synchronization transmission period, so that coverage of a synchronization channel can be enhanced; in addition, SCH information is transmitted multiple times in the synchronization transmission period, which reduces synchronization duration of user equipment. In addition, if a CCCH channel is configured on timeslot 1 to timeslot 7, SCH information that needs to be repeatedly transmitted may be preferentially configured on the CCCH channel, so that a time-frequency resource on which a channel is configured can be fully used, and resource utilization is improved.

Figure 3:
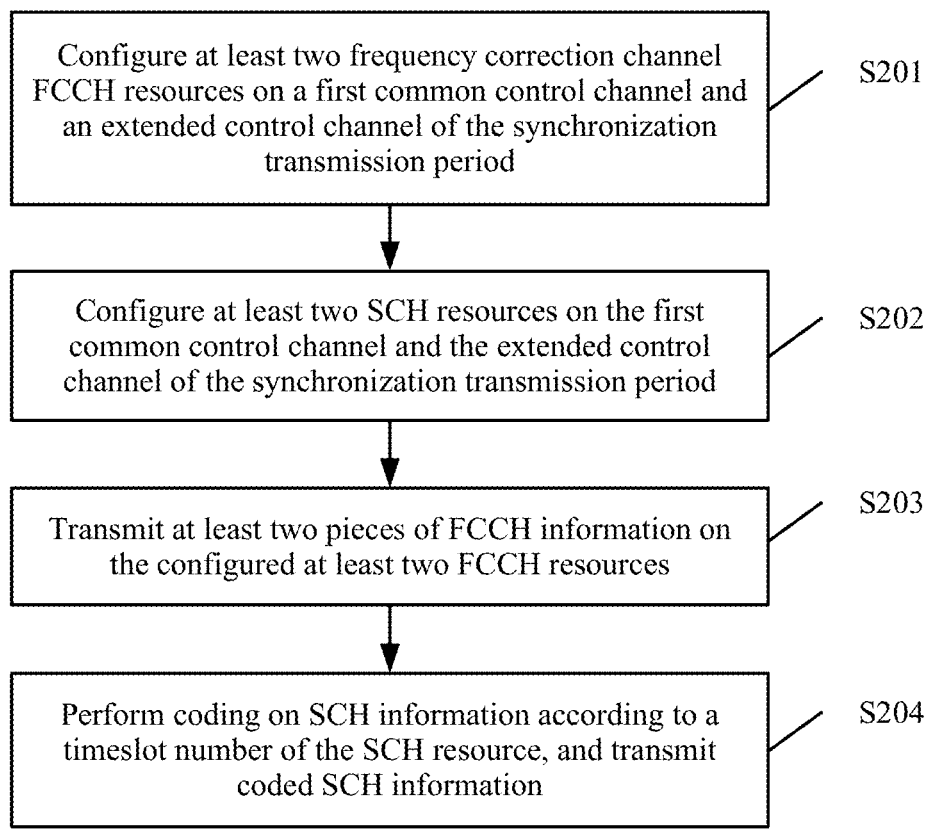
FIG. 3 is a schematic flowchart of another method for transmitting a synchronization channel SCH according to an embodiment of the present application.

Refer to FIG. 3, which is a schematic flowchart of another method for transmitting a synchronization channel SCH according to an embodiment of the present application, where the method may be performed by a base station. The method may include:

S201. Configure at least two frequency correction channel FCCH resources on a first common control channel and an extended control channel of the synchronization transmission period.

S202. Configure at least two SCH resources on the first common control channel and the extended control channel of the synchronization transmission period.

Specifically, there is no fixed sequence between step S201 and step S202, and step S201 and step S202 may be performed at the same time; that is, a base station configures at least two FCCH resources and at least two SCH resources on a first common control channel and an extended control channel of a synchronization transmission period at the same time. The synchronization transmission period is an interval at which an FCCH or an SCH is transmitted in a 51-frame multiframe structure. Herein, the synchronization transmission period may be the synchronization transmission period defined in the 51-frame multiframe structural diagram provided in the foregoing FIG. 1; that is, the synchronization transmission period includes 10 or 11 TDMA frames, and each TDMA frame includes a total of 8 timeslots from timeslot 0 to timeslot 7. The first common control channel is timeslot 0, the extended control channel does not include timeslot 0, and the extended control channel is used to configure an FCCH resource and an SCH resource that need to be repeatedly transmitted; each SCH resource is a timeslot of a TDMA frame, and each FCCH resource is a timeslot of a TDMA frame. The base station may configure at least two FCCH resources and at least two SCH resources in multiple manners, and the following describes multiple configuration manners in detail.

A first configuration manner is as follows: If the extended control channel is further defined as a common control channel, that is, a CCCH channel, and the extended control channel is one or more of timeslot 2, timeslot 4, or timeslot 6, the configured at least two SCH resources are timeslot 0 of a second TDMA frame of the synchronization transmission period and one or more of timeslot 2, timeslot 4, or timeslot 6 of the second TDMA frame of the synchronization transmission period; and the configured at least two FCCH resources are timeslot 0 of a first TDMA frame of the synchronization transmission period and one or more of timeslot 2, timeslot 4, or timeslot 6 of the first TDMA frame of the synchronization transmission period.

Specifically, the first configuration manner is applicable to a case in which both SCH information and FCCH information need to be repeatedly transmitted 2 to 4 times, and a sum of a first common control channel and an extended control channel in a base station needs to be greater than or equal to required transmission times of the SCH information. In addition, the sum of the first common control channel and the extended control channel in the base station needs to be greater than or equal to required transmission times of the FCCH information. The required transmission times of the SCH information are determined according to a requirement of a coverage level; a larger quantity of times of repeated transmission of the FCCH information indicates shorter frequency synchronization duration of user equipment. For description, refer to the following Table 6.

TABLE 6

|  | TDMA frame number | | | | | | | | | |
|---|---|---|---|---|---|---|---|---|---|---|
|  | 0 | 1 | 2 | 3 | 4 | 5 | 6 | 7 | 8 | 9 |
| DOWNLINK TN0 | F | S |  | BCCH norm | | | BCCH Ext, PAGCH | | | |
| DOWNLINK TN1 | | | | | | | | | | |
| DOWNLINK TN2 | F | S |  | BCCH norm | | | BCCH Ext, PAGCH | | | |
| DOWNLINK TN3 | | | | | | | | | | |
| DOWNLINK TN4 | F | S |  | BCCH norm | | | BCCH Ext, PAGCH | | | |
| DOWNLINK TN5 | | | | | | | | | | |
| DOWNLINK TN6 | F | S |  | BCCH norm | | | BCCH Ext, PAGCH | | | |
| DOWNLINK TN7 | | | | | | | | | | |

Table 6 shows a synchronization transmission period in TDMA frame 0 to TDMA frame 9 in a 51-frame multiframe structure, which includes 10 TDMA frames. F represents an FCCH, S represents an SCH, and TN0 to TN7 represent a total of 8 timeslots from timeslot 0 to timeslot 7. Each column represents one TDMA frame, and one TDMA frame includes 8 timeslots. Table 6 shows a case in which four CCCH channels are configured in the cell. Herein, TN0 is referred to as a first common control channel; TN2, TN4, and TN6 are referred to as extended control channels; and other timeslots may be configured as traffic channels. In Table 6, four FCCH resources and four SCH resources are respectively configured on the first common control channel and the extended control channels. After the four FCCH resources and the four SCH resources are configured, the base station may transmit four pieces of FCCH information on the configured four FCCH resources, and transmit four pieces of coded SCH information on the configured four SCH resources. In the prior art, if a CCCH channel is configured in one or more timeslots in TN2, TN4, and TN6, no information is transmitted in the first two TDMA frames corresponding to the CCCH channel. Therefore, in this embodiment of the present application, FCCH information and SCH information that need to be repeatedly transmitted may be preferentially configured on one or more CCCH channels in TN2, TN4, and TN6. In this way, a time-frequency resource on which a channel is configured can be fully used, which improves resource utilization; in addition, repeated transmission of SCH information is implemented in one TDMA frame, which reduces time synchronization duration of user equipment; in addition, repeated transmission of FCCH information is implemented in one TDMA frame, which reduces frequency synchronization duration of the user equipment. Frame number information carried in each piece of coded SCH information that is repeatedly transmitted in TN1 to TN7 is always the same as frame number information carried in coded SCH information in TN0, so that user equipment can combine received multiple pieces of coded SCH information for decoding. Certainly, if the FCCH information needs to be transmitted more than four times, more FCCH resources may continue to be configured on a traffic channel in TDMA frame 0; or if the SCH information needs to be transmitted more than four times, more SCH resources may also continue to be configured on a traffic channel in TDMA frame 1. Certainly, if there is a remaining resource that is not used to configure the FCCH resource in TDMA frame 0, more SCH resources may continue to be configured on remaining resources in TDMA frame 0 and TDMA frame 1, so as to meet required transmission times of the SCH information.

In addition, for the first configuration manner, the configured at least two SCH resources further include: timeslot 1, timeslot 3, timeslot 5, or timeslot 7 of at least one TDMA frame of the synchronization transmission period; and the configured at least two FCCH resources further include: timeslot 1, timeslot 3, timeslot 5, or timeslot 7 of the at least one TDMA frame of the synchronization transmission period. For example, when the FCCH information in Table 6 needs to be transmitted more than four times and the SCH information needs to be transmitted more than four times, multiple pieces of FCCH information and multiple pieces of SCH information may continue to be configured in fewest possible timeslots in TN1, TN3, TN5, or TN7 in Table 6, so as to meet required transmission times of the FCCH information and the SCH information. For description, refer to the following Table 7.

TABLE 7

|  | TDMA frame number | | | | | | | | | |
|---|---|---|---|---|---|---|---|---|---|---|
|  | 0 | 1 | 2 | 3 | 4 | 5 | 6 | 7 | 8 | 9 |
| DOWNLINK TN0 | F | S |  | BCCH norm | | | BCCH Ext, PAGCH | | | |
| DOWNLINK TN1 | F | S | S | S | S | S | | | | |
| DOWNLINK TN2 | F | S |  | BCCH norm | | | BCCH Ext, PAGCH | | | |
| DOWNLINK TN3 | | | | | | | | | | |
| DOWNLINK TN4 | F | S |  | BCCH norm | | | BCCH Ext, PAGCH | | | |
| DOWNLINK TN5 | | | | | | | | | | |
| DOWNLINK TN6 | F | S |  | BCCH norm | | | BCCH Ext, PAGCH | | | |
| DOWNLINK TN7 | | | | | | | | | | |

Table 7 shows a synchronization transmission period in TDMA frame 0 to TDMA frame 9 in a 51-frame multiframe structure, which includes 10 TDMA frames. F represents an FCCH, S represents an SCH, and TN0 to TN7 represent a total of 8 timeslots from timeslot 0 to timeslot 7. Each column represents one TDMA frame, and one TDMA frame includes 8 timeslots. Table 7 shows a case in which four CCCH channels are configured in the cell. Herein, TN0 is referred to as a first common control channel; TN2, TN4, and TN6 are referred to as extended control channels; and other timeslots may be configured as traffic channels. In Table 7, five FCCH resources and nine SCH resources are configured on the first common control channel, the extended control channels, and TN1. After the five FCCH resources and the nine SCH resources are configured, the base station may transmit five pieces of FCCH information and nine pieces of SCH information on the configured five FCCH resources and nine SCH resources. To reserve more traffic channels for transmitting service data, all remaining parts of more than four FCCH resources and remaining parts of more than four SCH resources may be configured on one channel; that is, one FCCH resource and five SCH resources are configured in TN1. When multiple FCCH resources and multiple SCH resources are configured on a channel in a synchronization transmission period, it is desirable that a quantity of remaining resources in the channel should be a multiple of four TDMA frames, so that service data information or other control information can be transmitted on the remaining resources by using a block as a granularity, so as to avoid a waste of a resource. Frame number information carried in each piece of SCH information that is repeatedly transmitted in TN1 to TN7 is always the same as frame number information carried in SCH information in TN0, so that user equipment can combine received multiple SCHs for decoding. Certainly, if a quantity of configured FCCH resources in Table 7 exceeds 5, and a quantity of SCH resources exceeds 9, multiple FCCH resources and multiple SCH resources may continue to be configured on another traffic channel.

A second configuration manner is as follows: If the extended control channel is further defined as a non-common control channel, and the extended control channel is one or more of timeslot 1 to timeslot 7, the configured at least two SCH resources include: timeslot 0 of a second TDMA frame of the synchronization transmission period and any one of timeslot 1 to timeslot 7 of at least one TDMA frame of the synchronization transmission period; and the configured at least two FCCH resources include: timeslot 0 of a first TDMA frame of the synchronization transmission period and any one of timeslot 1 to timeslot 7 of the at least one TDMA frame of the synchronization transmission period.

Specifically, the second configuration manner is applicable to a case in which none of timeslot 1 to timeslot 7 is configured as a CCCH channel. For description, refer to the following Table 8.

TABLE 8

|  | TDMA frame number | | | | | | | | | |
|---|---|---|---|---|---|---|---|---|---|---|
|  | 0 | 1 | 2 | 3 | 4 | 5 | 6 | 7 | 8 | 9 |
| DOWNLINK TN0 | F | S |  | BCCH norm | | | BCCH Ext, PAGCH | | | |
| DOWNLINK TN1 | F | F | S | S | S | S | | | | |
| DOWNLINK TN2 | | | | | | | | | | |
| DOWNLINK TN3 | | | | | | | | | | |
| DOWNLINK TN4 | | | | | | | | | | |
| DOWNLINK TN5 | | | | | | | | | | |
| DOWNLINK TN6 | | | | | | | | | | |
| DOWNLINK TN7 | | | | | | | | | | |

Table 8 shows a synchronization transmission period in TDMA frame 0 to TDMA frame 9 in a 51-frame multiframe structure, which includes 10 TDMA frames. F represents an FCCH, S represents an SCH, and TN0 to TN7 represent a total of 8 timeslots from timeslot 0 to timeslot 7. Each column represents one TDMA frame, and one TDMA frame includes 8 timeslots. Table 8 shows a case in which one CCCH channel is configured in the cell. Herein, TN0 is referred to as a first common control channel; TN1 to TN7 are referred to as alternative extended control channels, and the extended control channels are non-common control channels, that is, before being selected as the extended control channels, TN1 to TN7 may be configured as traffic channels. In Table 8, TN1 is a selected extended control channel, and three FCCH resources and five SCH resources are configured on the first common control channel and the extended control channels. After the three FCCH resources and the five SCH resources are configured, the base station may transmit three pieces of FCCH information and five pieces of SCH information on the configured three FCCH resources and five SCH resources. To reserve more traffic channels for transmitting service data, all two FCCH resources and four SCH resources may be configured on one extended control channel; that is, the two FCCH resources and the four SCH resources are configured in TN1, so that TN2 to TN7 timeslots can be used to transmit service data. When multiple FCCH resources and multiple SCH resources are configured on a channel in a synchronization transmission period, it is desirable that a quantity of remaining resources in the channel should be a multiple of four TDMA frames, so that service data information or other control information can be transmitted on the remaining resources by using a block as a granularity, so as to avoid a waste of a resource. Frame number information carried in each piece of SCH information that is repeatedly transmitted in TN1 to TN7 is always the same as frame number information carried in SCH information in TN0, so that user equipment can combine received multiple SCHs for decoding. Certainly, if more FCCH resources and SCH resources need to be configured in Table 8, multiple FCCH resources and multiple SCH resources may continue to be configured on another traffic channel.

S203. Transmit at least two pieces of FCCH information on the configured at least two FCCH resources.

S204. Perform coding on SCH information according to a timeslot number of the SCH resource, and transmit coded SCH information.

Specifically, there is no fixed sequence between step S203 and step S204. When transmitting the at least two pieces of FCCH information and the coded SCH information, the base station performs transmission only according to timeslot locations and TDMA frame locations at which the preconfigured FCCH resources and SCH resources are located. Using the foregoing Table 6 as an example, after the base station configures the FCCH resources and the SCH resources, the base station may begin to transmit FCCH information from TDMA frame 0 according to the chronological order in Table 6, and then transmit coded SCH information in TDMA frame 1.

Before transmitting the coded SCH information, the base station first needs to perform coding on SCH information according to a timeslot number of an SCH resource. Because another timeslot is introduced into an FCCH resource in addition to TN0, user equipment cannot identify which timeslot is a TN0 timeslot in a received signal, and a timeslot scrambling process needs to be added in an original signal transmission process of an SCH; that is, coding is performed on SCH information, so as to obtain coded SCH information, so that the user equipment can learn a timeslot in which the user equipment begins to receive and demodulate the coded SCH information.

In this embodiment of the present application, that at least two SCH resources are configured on a first common control channel and an extended control channel of the synchronization transmission period may specifically include: determining the at least two SCH resources according to a default configuration.

In this embodiment of the present application, multiple FCCH resources are configured on a first common control channel and an extended control channel, so that frequency synchronization duration of an edge user can be reduced; in addition, multiple SCH resources are configured on the first common control channel and the extended control channel, so that coverage of a synchronization channel can be effectively enhanced. In addition, if a CCCH channel is configured on timeslot 1 to timeslot 7, FCCH information and SCH information that need to be repeatedly transmitted may be preferentially configured on the CCCH channel, so that a time-frequency resource on which a channel is configured can be fully used, and resource utilization is improved.

Figure 4:
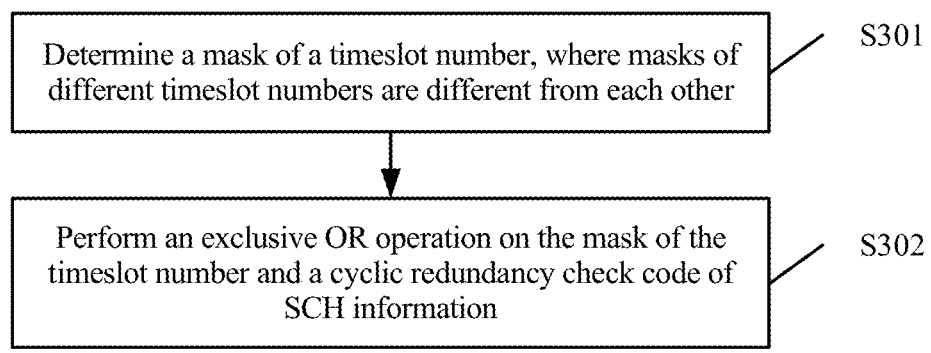
FIG. 4 is a schematic flowchart of a method for coding SCH information according to an embodiment of the present application.

Refer to FIG. 4, which is a schematic flowchart of a method for coding SCH information according to an embodiment of the present application. This embodiment of the present application may correspond to S204 in the embodiment corresponding to the foregoing FIG. 3, and the method may include:

S301. Determine a mask of a timeslot number, where masks of different timeslot numbers are different from each other.

S302. Perform an exclusive OR operation on the mask of the timeslot number and a cyclic redundancy check code of SCH information.

Specifically, a base station may first determine a mask of a timeslot number; that is, each timeslot number corresponds to a mask, masks of different timeslot numbers are different from each other, and therefore there may be 8 groups of masks that are different from each other. Coding is performed on SCH information, that is, scrambling is performed on the SCH information, and a specific scrambling process may be as follows: An SCH is entered as 25-bit information, and a 10-bit cyclic redundancy check code of SCH information is generated from the 25-bit information; then an exclusive OR operation is performed on the cyclic redundancy check code of the SCH information and a mask of a corresponding timeslot number, for example, a modulo-2 scrambling operation is performed, so that a scrambled cyclic redundancy check code can be generated; and in this case, a tail bit is further added and ½ convolutional coding is performed, so that coded 78-bit information can be output, and coded SCH information is obtained. Coded SCH information whose timeslot number is n may be obtained by performing an exclusive OR operation on 8 groups of masks of different timeslot numbers and cyclic redundancy check codes of SCH information that are to be transmitted at different timeslots. For example, 8 groups of different masks are shown in the following Table 9.

TABLE 9

| Mask index | SCH CRC mask $<x_0, \ldots, x_9>$ |
|---|---|
| 0 | <0, 0, 0, 0, 0, 0, 0, 0, 0, 0> |
| 1 | <0, 1, 0, 1, 0, 1, 0, 1, 0, 1> |
| 2 | <0, 0, 1, 1, 0, 0, 1, 1, 0, 0> |
| 3 | <0, 1, 1, 0, 0, 1, 1, 0, 0, 1> |
| 4 | <0, 0, 0, 0, 1, 1, 1, 1, 0, 0> |
| 5 | <0, 1, 0, 1, 1, 0, 1, 0, 0, 1> |
| 6 | <0, 0, 1, 1, 1, 1, 0, 0, 0, 0> |
| 7 | <0, 1, 1, 0, 1, 0, 0, 1, 0, 1> |

According to Table 9, coded SCH information in timeslot 0 may be obtained by performing an exclusive OR operation on a mask whose timeslot number is 0 and a cyclic redundancy check code of SCH information in timeslot 0. Likewise, coded SCH information in timeslot 1 may be obtained by performing an exclusive OR operation on a mask whose timeslot number is 1 and a cyclic redundancy check code of SCH information in timeslot 1. By analogy, coded SCH information in all timeslots may be obtained.

In this embodiment of the present application, coded SCH information may be obtained by performing an exclusive OR operation on a cyclic redundancy check code of SCH information and a mask of a corresponding timeslot number, and the coded SCH information is transmitted, so that user equipment can learn a timeslot in which the user equipment begins to receive and demodulate the coded SCH information.

Figure 5:
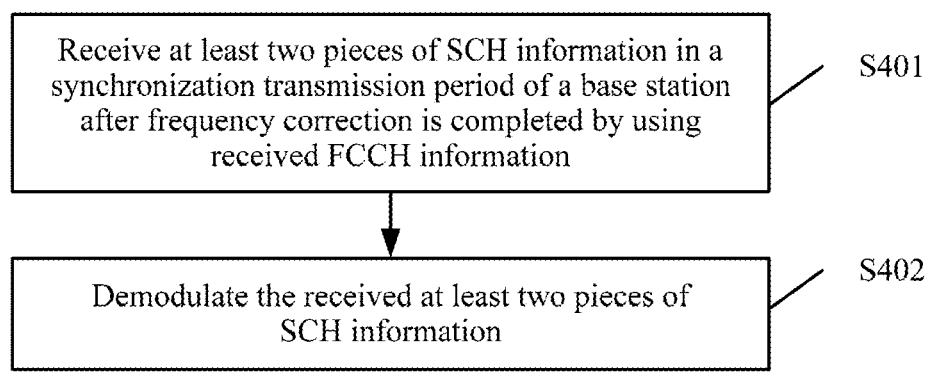
FIG. 5 is a schematic flowchart of a method for receiving a synchronization channel SCH according to an embodiment of the present application.

Refer to FIG. 5, which is a schematic flowchart of a method for receiving a synchronization channel SCH according to an embodiment of the present application. The method may be performed by user equipment, and the method may include:

S401. Receive at least two pieces of SCH information in a synchronization transmission period of a base station after frequency correction is completed by using received FCCH information.

S402. Demodulate the received at least two pieces of SCH information.

Specifically, the synchronization transmission period includes 10 or 11 TDMA frames, and each TDMA frame includes a total of 8 timeslots from timeslot 0 to timeslot 7. For a specific definition of the synchronization transmission period, refer to the synchronization transmission period in the 51-frame multiframe structural diagram corresponding to the foregoing FIG. 1.

The user equipment first receives FCCH information, so as to perform frequency synchronization; in this case, the user equipment receives the FCCH information once at intervals of one synchronization transmission period. After frequency correction is completed by using the received FCCH information, at least two pieces of SCH information may be received in a synchronization transmission period of a base station, and the received at least two pieces of SCH information may be demodulated. Because the user equipment may demodulate multiple pieces of SCH information in one synchronization transmission period, coverage of a synchronization channel for the user equipment can be enhanced. The received at least two pieces of SCH information are transmitted by the base station on a first common control channel and an extended control channel of the synchronization transmission period, the first common control channel is timeslot 0, and the extended control channel does not include timeslot 0. Before transmitting at least two pieces of SCH information, the base station needs to configure at least two SCH resources on a corresponding timeslot and a corresponding TDMA frame. The base station may configure the SCH resource in multiple manners. For a specific configuration process, refer to the description in S101 in the embodiment corresponding to the foregoing FIG. 2, and details are not described herein again.

In this embodiment of the present application, at least two pieces of SCH information are received in a synchronization transmission period of a base station, and the received at least two pieces of SCH information are demodulated, so that coverage of a synchronization channel for the user equipment can be enhanced.

Figure 6:
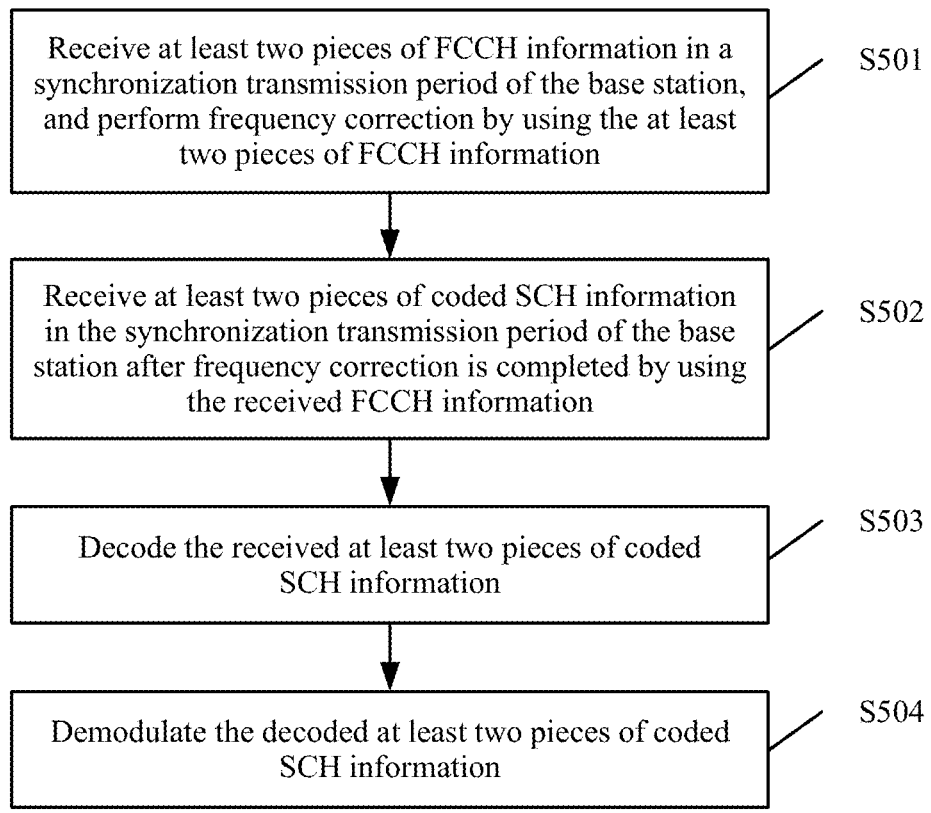
FIG. 6 is a schematic flowchart of another method for receiving a synchronization channel SCH according to an embodiment of the present application.

Refer to FIG. 6, which is a schematic flowchart of another method for receiving a synchronization channel SCH according to an embodiment of the present application. The method may be performed by user equipment, and the method may include:

S501. Receive at least two pieces of FCCH information in a synchronization transmission period of the base station, and perform frequency correction by using the at least two pieces of FCCH information.

Specifically, the user equipment may receive the at least two pieces of FCCH information in the synchronization transmission period of the base station, and perform frequency correction by using the at least two pieces of FCCH information. Because the user equipment may receive multiple pieces of FCCH information in one synchronization transmission period, frequency synchronization duration of edge user equipment may be effectively reduced. The synchronization transmission period includes 10 or 11 TDMA frames, and each TDMA frame includes a total of 8 timeslots from timeslot 0 to timeslot 7. For a specific definition of the synchronization transmission period, refer to the synchronization transmission period in the 51-frame multiframe structural diagram corresponding to the foregoing FIG. 1.

S502. Receive at least two pieces of coded SCH information in the synchronization transmission period of the base station after frequency correction is completed by using the received FCCH information.

S503. Decode the received at least two pieces of coded SCH information.

Specifically, after completing frequency correction by using the received FCCH information, the user equipment may receive the at least two pieces of coded SCH information in the synchronization transmission period of the base station, and decode the received at least two pieces of coded SCH information. The at least two pieces of coded SCH information are obtained by using the base station to perform coding on the SCH information according to timeslot numbers of the configured SCH resources. Because the user equipment receives multiple pieces of FCCH information in the synchronization transmission period, the user equipment cannot identify which timeslot is a TN0 timeslot in a received signal. In this case, the received at least two pieces of coded SCH information is decoded, so that the user equipment can learn when to begin to demodulate the decoded at least two pieces of coded SCH information. The received at least two pieces of FCCH information and at least two pieces of coded SCH information are transmitted by the base station on a first common control channel and an extended control channel of the synchronization transmission period, the first common control channel is timeslot 0, and the extended control channel does not include timeslot 0. Before transmitting at least two pieces of FCCH information and at least two pieces of coded SCH information, the base station needs to configure at least two FCCH resources and at least two SCH resources on a corresponding timeslot and a corresponding TDMA frame. The base station may configure the FCCH resources and the SCH resources in multiple manners. For a specific configuration process, refer to the description in S201 and S202 in the embodiment corresponding to the foregoing FIG. 3, and details are not described herein again. The base station performs coding on SCH information; that is, the base station performs scrambling on the SCH information by using a mask of a corresponding timeslot number. For a specific process in which the base station performs scrambling on the SCH information, refer to the description in the embodiment corresponding to the foregoing FIG. 4, and details are not described herein again. The user equipment decodes the received at least two pieces of coded SCH information; that is, the user equipment performs descrambling on the received at least two pieces of coded SCH information, so as to obtain the SCH information.

S504. Demodulate the decoded at least two pieces of coded SCH information.

Specifically, the user equipment performs descrambling on scrambled SCH information, so as to obtain the decoded at least two pieces of coded SCH information; and in this case, the user equipment further demodulates the decoded at least two pieces of coded SCH information, so that coverage of a synchronization channel for the user equipment can be enhanced.

In this embodiment of the present application, at least two pieces of FCCH information are received in a synchronization transmission period of the base station, so that frequency synchronization duration of edge user equipment can be effectively reduced; in addition, after frequency correction is completed by using the received FCCH information, at least two pieces of coded SCH information may be received in the synchronization transmission period of the base station, and the received at least two pieces of coded SCH information may be decoded, so as to demodulate decoded at least two pieces of coded SCH information, so that coverage of a synchronization channel for the user equipment can be enhanced.

An embodiment of the present application further provides a method for decoding SCH information. The method may correspond to S503 in the embodiment corresponding to the foregoing FIG. 6, and the method may include:

It is assumed that FCCH information used to complete frequency correction is a specific timeslot. Timeslots in which all SCHs are located are determined according to a relative location between the specific timeslot and SCH information, and descrambling is performed according to a mask of a corresponding timeslot, and then whether a CRC (Cyclic Redundancy Check, cyclic redundancy check code) is 0 is determined. If the CRC is 0, SCH original information is extracted by means of decoding; or if the CRC is not 0, it is assumed that an FCCH is a next specific timeslot, and the foregoing process is repeated until an identified CRC is 0 and SCH original information is extracted.

Using Table 6 as an example, a description of a receiving side is as follows: Because a transmit end FCCH occupies multiple timeslots, the receiving side cannot determine a location of a timeslot by using a location at which received FCCH information is located. Because the receiving side needs to use multiple pieces of FCCH information to complete frequency correction, a specific quantity of used FCCHs is related to a value of a difference between an original frequency of the receiving side and that of a base station side, and is not fixed. Therefore, an FCCH that is in Table 6 and that is used to complete frequency correction is not fixed. In the following, that an FCCH on which an FCCH that actually completes frequency correction is TN4 in Table 6 is used as an example. A processing procedure of the receiving side is as follows: To obtain timeslot information, the receiving side may assume that a timeslot in which the FCCH used to complete frequency correction is located is timeslot 0. There are four pieces of SCH information at locations that are 8 timeslots, 10 timeslots, 12 timeslots, and 14 timeslots away from timeslot 0, and corresponding timeslots are respectively TN0, TN2, TN4, and TN6. The receive end performs decoding on these four pieces of SCH information by using masks corresponding to timeslot 0, timeslot 2, timeslot 4, and timeslot 6 in Table 6. Because timeslot 0 in which the FCCH is assumed to be located is not the same as timeslot 4 in which the FCCH that is actually used to complete frequency correction is located, when the SCH information is decoded, a CRC is not 0, and the receiving side considers that the assumption is false. Next, it is assumed that the timeslot in which the FCCH that is used to complete frequency correction is located is timeslot 2. There are four pieces of SCH information at locations that are 6 timeslots, 8 timeslots, 10 timeslots, and 12 timeslots away from timeslot 2, and corresponding timeslots are respectively TN0, TN2, TN4, and TN6. The receive end performs decoding on these four pieces of SCH information by using the masks corresponding to timeslot 0, timeslot 2, timeslot 4, and timeslot 6 in Table 6. Because timeslot 2 in which the FCCH is assumed to be located is not the same as timeslot 4 in which the FCCH that is actually used to complete frequency correction is located, when the SCH information is decoded, a CRC is not 0, and the receiving side considers the assumption is false. Further, it is assumed that the timeslot in which the FCCH that is used to complete frequency correction is located is timeslot 4. In this case, by using masks corresponding to timeslot 0, timeslot 2, timeslot 4, and timeslot 6 in Table 6, decoding is performed on the four pieces of SCH information in timeslots that are 4, 6, 8, and 10 timeslots away from timeslot 4. Because timeslot 4 in which the FCCH is assumed to be located is exactly timeslot 4 in which the FCCH that is actually used to complete frequency correction is located, when the SCH information is decoded, a CRC is 0, and the receive end clearly learns timeslot information corresponding to the SCH information, and may obtain correct SCH original information by means of decoding.

Figure 7:
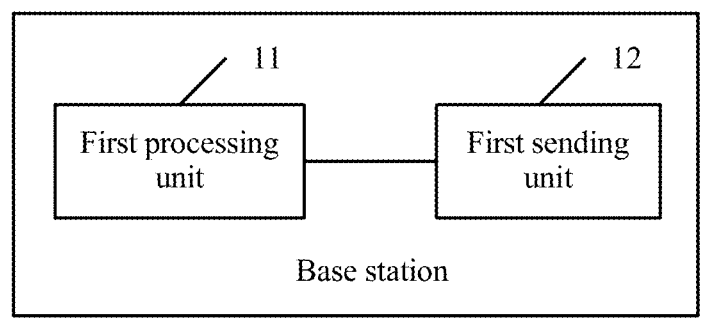
FIG. 7 is a schematic structural diagram of a base station according to an embodiment of the present application.

Refer to FIG. 7, which is a schematic structural diagram of a base station according to an embodiment of the present application. The base station may include: a first processing unit 11 and a first sending unit 12.

The first processing unit 11 is adapted to configure at least two synchronization channel SCH resources on a first common control channel and an extended control channel of a synchronization transmission period.

Specifically, the synchronization transmission period is an interval at which an FCCH or an SCH is transmitted in a 51-frame multiframe structure. For example, the synchronization transmission period may be the synchronization transmission period in the 51-frame multiframe structural diagram provided in the foregoing FIG. 1; that is, the synchronization transmission period includes 10 or 11 TDMA frames, and each TDMA frame includes a total of 8 timeslots from timeslot 0 to timeslot 7. The first common control channel is timeslot 0, the extended control channel does not include timeslot 0, and each SCH resource is a timeslot of a TDMA frame.

The first processing unit 11 may configure at least two SCH resources on the first common control channel and the extended control channel of the synchronization transmission period. The SCH resource may be configured in many manners. The following describes the configuration manners of the SCH resource in detail.

A first configuration manner is as follows: If the extended control channel is further defined as a common control channel, that is, a CCCH channel, and the extended control channel is one or more of timeslot 2, timeslot 4, or timeslot 6, the at least two SCH resources configured by the first processing unit 11 are timeslot 0 of a second TDMA frame of the synchronization transmission period and one or more of timeslot 2, timeslot 4, or timeslot 6 of the second TDMA frame of the synchronization transmission period.

Specifically, the first configuration manner is applicable to a case in which SCH information needs to be repeatedly transmitted 2 to 4 times, and a sum of a first common control channel and an extended control channel in a base station needs to be greater than or equal to required transmission times of the SCH information. The required transmission times of the SCH information are determined according to a requirement of a coverage level. For a specific implementation process of the first configuration manner, refer to the description of Table 2 in S101 in the embodiment corresponding to the foregoing FIG. 2, and details are not described herein again.

A second configuration manner is as follows: If the extended control channel is further defined as a common control channel, and the extended control channel is one or more of timeslot 2, timeslot 4, or timeslot 6, the at least two SCH resources configured by the first processing unit 11 are timeslot 0 of a second TDMA frame of the synchronization transmission period and one or more of timeslot 2, timeslot 4, or timeslot 6 of a first TDM frame and the second TDMA frame of the synchronization transmission period.

Specifically, the second configuration manner is applicable to a case in which SCH information needs to be repeatedly transmitted 2 to 7 times, and twice of a sum of a first common control channel and an extended control channel in a base station needs to be greater than required transmission times of the SCH information. For a specific implementation process of the second configuration manner, refer to the description of Table 3 in S101 in the embodiment corresponding to the foregoing FIG. 2, and details are not described herein again.

For the first configuration manner and the second configuration manner, the at least two SCH resources configured by the first processing unit 11 further include: timeslot 1, timeslot 3, timeslot 5, or timeslot 7 of at least one TDMA frame of the synchronization transmission period. A purpose of this configuration manner is to allocate as many extra SCH resources as possible in one traffic channel after an SCH resource is configured in a CCCH channel, so that more traffic channels are reserved for transmitting service data. For a specific implementation process of this configuration manner, refer to the description of Table 4 in S101 in the embodiment corresponding to the foregoing FIG. 2, and details are not described herein again.

A third configuration manner is as follows: If the extended control channel is further defined as a non-common control channel, and the extended control channel is one or more of timeslot 1 to timeslot 7, the at least two SCH resources configured by the first processing unit 11 include: timeslot 0 of a second TDMA frame of the synchronization transmission period and any one of timeslot 1 to timeslot 7 of at least one TDMA frame of the synchronization transmission period.

Specifically, the third configuration manner is applicable to a case in which none of timeslot 1 to timeslot 7 is configured as a CCCH channel. For a specific implementation process of the third configuration manner, refer to the description of Table 5 in S101 in the embodiment corresponding to the foregoing FIG. 2, and details are not described herein again.

Certainly, in any one of the foregoing configuration manners in this embodiment of the present application, a multiframe structure of a TN0 timeslot always remains the same as that defined in an existing protocol. In the prior art, if a CCCH channel is configured in one or more timeslots in TN2, TN4, and TN6, no information is transmitted in the first two TDMA frames corresponding to the CCCH channel. Therefore, in this embodiment of the present application, SCH information that needs to be repeatedly transmitted may be preferentially configured on one or more CCCH channels in TN2, TN4, and TN6. In this way, a time-frequency resource on which a channel is configured can be fully used, which improves resource utilization; in addition, repeated transmission of SCH information is implemented in one TDMA frame, which reduces synchronization duration of user equipment. Frame number information carried in each piece of SCH information that is repeatedly transmitted in TN1 to TN7 is always the same as frame number information carried in SCH information in TN0, so that user equipment can combine received multiple SCHs for decoding.

The first sending unit 12 is configured to transmit at least two pieces of SCH information on the configured at least two SCH resources, where one piece of SCH information is transmitted on each SCH resource, and the at least two pieces of SCH information include same frame number information.

Specifically, one piece of SCH information is transmitted on each SCH resource, and the at least two pieces of SCH information include same frame number information; that is, frame number information carried in each piece of SCH information that is repeatedly transmitted in timeslot 1 to timeslot 7 is always the same as frame number information carried in SCH information in timeslot 0, so that user equipment can combine received multiple SCHs for decoding. After the first processing unit 11 configures the SCH information, the first sending unit 12 may transmit at least two pieces of SCH information on the configured at least two SCH resources. Using Table 3 in step S101 in the embodiment corresponding to the foregoing FIG. 2 as an example, according to Table 3, the first processing unit 11 configures a total of seven SCH resources in the first two TDMA frames of the first common control channel and the extended control channel. Therefore, the first sending unit 12 may begin to transmit SCH information from TDMA frame 0 according to the chronological order in Table 3, and then transmit SCH information in TDMA frame 1.

The first processing unit 11 provided in this embodiment of the present application may be specifically configured to determine the at least two SCH resources according to a default configuration.

In this embodiment of the present application, SCH resources are configured on a first common control channel and an extended control channel, so as to implement repeated transmission of SCH information in a synchronization transmission period, so that coverage of a synchronization channel can be enhanced; SCH information is transmitted multiple times in the synchronization transmission period, which reduces synchronization duration of user equipment. In addition, if a CCCH channel is configured on timeslot 1 to timeslot 7, SCH information that needs to be repeatedly transmitted may be preferentially configured on the CCCH channel, so that a time-frequency resource on which a channel is configured can be fully used, and resource utilization is improved.

Figure 8:
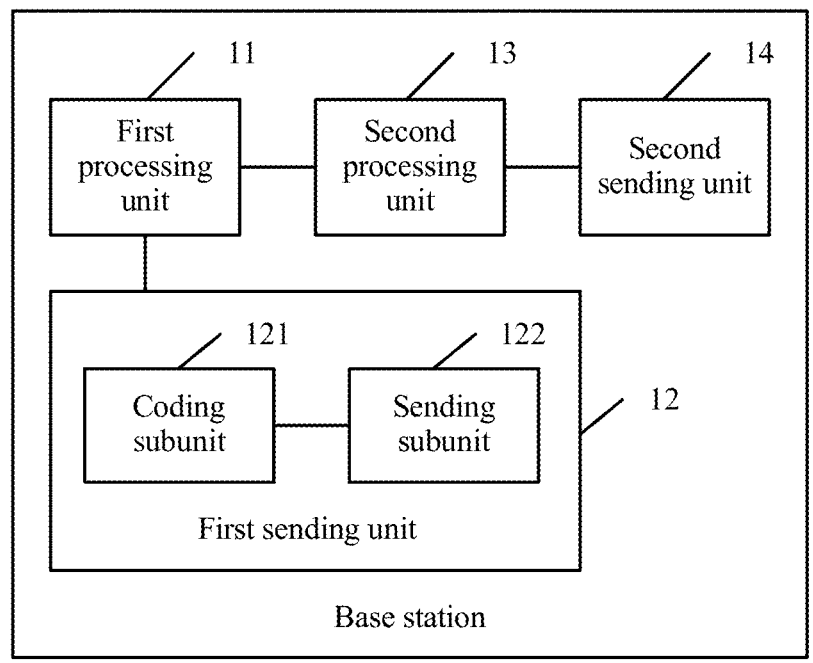
FIG. 8 is a schematic structural diagram of another base station according to an embodiment of the present application.

Refer to FIG. 8, which is a schematic structural diagram of another base station according to an embodiment of the present application. The base station may include: a first processing unit 11, a second processing unit 13, a second sending unit 14, and a first sending unit 12. The first sending unit 12 may include: a coding subunit 121 and a sending subunit 122.

The first processing unit 11 is adapted to configure at least two synchronization channel SCH resources on a first common control channel and an extended control channel of a synchronization transmission period.

The second processing unit 13 is adapted to configure at least two frequency correction channel FCCH resources on the first common control channel and the extended control channel of the synchronization transmission period.

Specifically, the first processing unit 11 and the second processing unit 13 may perform related operations at the same time. That is, when the first processing unit 11 configures at least two SCH resources on the first common control channel and the extended control channel of the synchronization transmission period, the second processing unit 13 configures at least two FCCH resources on the first common control channel and the extended control channel of the synchronization transmission period. The synchronization transmission period is an interval at which an FCCH or an SCH is transmitted in a 51-frame multiframe structure. Herein, the synchronization transmission period may be the synchronization transmission period defined in the 51-frame multiframe structural diagram provided in the foregoing FIG. 1; that is, the synchronization transmission period includes 10 or 11 TDMA frames, and each TDMA frame includes a total of 8 timeslots from timeslot 0 to timeslot 7. The first common control channel is timeslot 0, the extended control channel does not include timeslot 0, and the extended control channel is used to configure an FCCH resource and an SCH resource that need to be repeatedly transmitted; each SCH resource is a timeslot of a TDMA frame, and each FCCH resource is a timeslot of a TDMA frame. The first processing unit 11 and the second processing unit 13 may configure at least two FCCH resources and at least two SCH resources in multiple manners, and the following describes multiple configuration manners in detail.

A first configuration manner is as follows: If the extended control channel is further defined as a common control channel, that is, a CCCH channel, and the extended control channel is one or more of timeslot 2, timeslot 4, or timeslot 6, the at least two SCH resources configured by the first processing unit 11 are timeslot 0 of a second TDMA frame of the synchronization transmission period and one or more of timeslot 2, timeslot 4, or timeslot 6 of the second TDMA frame of the synchronization transmission period; and the configured at least two FCCH resources in the second processing unit 13 are timeslot 0 of a first TDMA frame of the synchronization transmission period and one or more of timeslot 2, timeslot 4, or timeslot 6 of the first TDMA frame of the synchronization transmission period.

Specifically, the first configuration manner is applicable to a case in which both SCH information and FCCH information need to be repeatedly transmitted 2 to 4 times, and a sum of a first common control channel and an extended control channel in a base station needs to be greater than or equal to required transmission times of the SCH information. In addition, the sum of the first common control channel and the extended control channel in the base station needs to be greater than or equal to required transmission times of the FCCH information. The required transmission times of the SCH information are determined according to a requirement of a coverage level; a larger quantity of times of repeated transmission of the FCCH information indicates shorter frequency synchronization duration of user equipment. For a specific implementation process of the first configuration manner, refer to the description of Table 6 in S201 and S202 in the embodiment corresponding to the foregoing FIG. 3, and details are not described herein again.

For the first configuration manner, the configured at least two SCH resources further include: timeslot 1, timeslot 3, timeslot 5, or timeslot 7 of at least one TDMA frame of the synchronization transmission period; and the configured at least two FCCH resources further include: timeslot 1, timeslot 3, timeslot 5, or timeslot 7 of the at least one TDMA frame of the synchronization transmission period. For example, when the FCCH information in Table 6 in the embodiment corresponding to FIG. 3 needs to be transmitted more than four times and the SCH information needs to be transmitted more than four times, multiple pieces of FCCH information and multiple pieces of SCH information may continue to be configured in fewest possible timeslots in TN1, TN3, TN5, or TN7 in Table 6, so as to meet required transmission times of the FCCH information and the SCH information. For a specific implementation process of this configuration manner, refer to the description of Table 7 in S201 and S202 in the embodiment corresponding to the foregoing FIG. 3, and details are not described herein again.

A second configuration manner is as follows: If the extended control channel is further defined as a non-common control channel, and the extended control channel is one or more of timeslot 1 to timeslot 7, the at least two SCH resources configured by the first processing unit 11 include: timeslot 0 of a second TDMA frame of the synchronization transmission period and any one of timeslot 1 to timeslot 7 of at least one TDMA frame of the synchronization transmission period; and the configured at least two FCCH resources in the second processing unit 13 include: timeslot 0 of a first TDMA frame of the synchronization transmission period and any one of timeslot 1 to timeslot 7 of the at least one TDMA frame of the synchronization transmission period.

Specifically, the second configuration manner is applicable to a case in which none of timeslot 1 to timeslot 7 is configured as a CCCH channel. For a specific implementation process of the second configuration manner, refer to the description of Table 8 in S201 and S202 in the embodiment corresponding to the foregoing FIG. 3, and details are not described herein again.

Certainly, in any one of the foregoing configuration manners in this embodiment of the present application, a multiframe structure of a TN0 timeslot always remains the same as that defined in an existing protocol. In the prior art, if a CCCH channel is configured in one or more timeslots in TN2, TN4, and TN6, no information is transmitted in the first two TDMA frames corresponding to the CCCH channel. Therefore, in this embodiment of the present application, FCCH information and SCH information that need to be repeatedly transmitted may be preferentially configured on one or more CCCH channels in TN2, TN4, and TN6, so that a time-frequency resource on which a channel is configured can be fully used, and resource utilization is improved. Frame number information carried in each piece of SCH information that is repeatedly transmitted in TN1 to TN7 is always the same as frame number information carried in SCH information in TN0, so that user equipment can combine received multiple SCHs for decoding.

The second sending unit 14 is configured to transmit at least two pieces of FCCH information on the configured at least two FCCH resources.

The first sending unit 12 includes:

the coding subunit 121, configured to perform coding on SCH information according to a timeslot number of an SCH resource; and the sending subunit 122, configured to transmit coded SCH information, where the coded SCH information includes timeslot number information about the SCH resource.

Specifically, there is no fixed execution sequence between the second sending unit 14 and the sending subunit 122. When transmitting the at least two pieces of FCCH information and the coded SCH information, the second sending unit 14 and the sending subunit 122 perform transmission only according to timeslot locations and TDMA frame locations at which the configured FCCH resources and SCH resources are located.

Before the sending subunit 122 transmits coded SCH information, the coding subunit 121 first needs to perform coding on SCH information according to a timeslot number of an SCH resource. Because another timeslot is introduced into an FCCH resource in addition to TN0, user equipment cannot identify which timeslot is a TN0 timeslot in a received signal, and a timeslot scrambling process needs to be added in an original signal transmission process of an SCH; that is, coding is performed on SCH information, so as to obtain coded SCH information, so that the user equipment can learn a timeslot in which the user equipment begins to receive and demodulate the coded SCH information.

The coding subunit 121 is specifically configured to determine a mask of a timeslot number, and perform an exclusive OR operation on the mask of the timeslot number and a cyclic redundancy check code of the SCH information.

Specifically, the coding subunit 121 may first determine a mask of a timeslot number; that is, each timeslot number corresponds to a mask, masks of different timeslot numbers are different from each other, and therefore there may be 8 groups of masks that are different from each other. The coding subunit 121 performs coding on SCH information; that is, the coding subunit 121 performs scrambling on the SCH information. A specific scrambling process may be as follows: An SCH is entered as 25-bit information, a 10-bit cyclic redundancy check code of SCH information is generated from the 25-bit information; then the coding subunit 121 performs an exclusive OR operation on the cyclic redundancy check code of the SCH information and a mask of a corresponding timeslot number, for example, a modulo-2 scrambling operation is performed, so that a scrambled cyclic redundancy check code can be generated; and in this case, a tail bit is further added and ½ convolutional coding is performed, so that coded 78-bit information can be output, and coded SCH information is obtained. The coding subunit 121 may obtain coded SCH information whose timeslot number is n, by performing an exclusive OR operation on 8 groups of masks of different timeslot numbers and cyclic redundancy check codes of SCH information that are to be transmitted at different timeslots.

The first processing unit 11 provided in this embodiment of the present application may be specifically configured to determine the at least two SCH resources according to a default configuration.

In this embodiment of the present application, multiple FCCH resources are configured on a first common control channel and an extended control channel, so that frequency synchronization duration of an edge user can be reduced; in addition, multiple SCH resources are configured on the first common control channel and the extended control channel, so that coverage of a synchronization channel can be effectively enhanced. In addition, if a CCCH channel is configured on timeslot 1 to timeslot 7, FCCH information and SCH information that need to be repeatedly transmitted may be preferentially configured on the CCCH channel, so that a time-frequency resource on which a channel is configured can be fully used, and resource utilization is improved.

Figure 9:
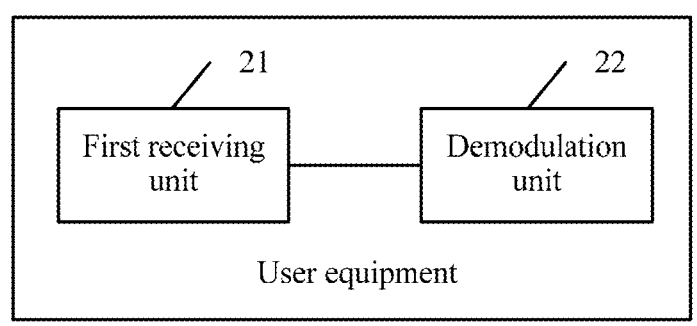
FIG. 9 is a schematic structural diagram of user equipment according to an embodiment of the present application.

Refer to FIG. 9, which is a schematic structural diagram of user equipment according to an embodiment of the present application. The user equipment may include: a first receiving unit 21 and a demodulation unit 22.

The first receiving unit 21 is configured to receive at least two pieces of SCH information in a synchronization transmission period of a base station after frequency correction is completed by using received FCCH information.

The demodulation unit 22 is configured to demodulate the received at least two pieces of SCH information.

Specifically, the synchronization transmission period includes 10 or 11 TDMA frames, and each TDMA frame includes a total of 8 timeslots from timeslot 0 to timeslot 7. For a specific definition of the synchronization transmission period, refer to the synchronization transmission period in the 51-frame multiframe structural diagram corresponding to the foregoing Table 1.

The user equipment first receives FCCH information, so as to perform frequency synchronization. Herein, the user equipment receives the FCCH information once at intervals of one synchronization transmission period. After frequency correction is completed by using the received FCCH information, the first receiving unit 21 may receive at least two pieces of SCH information in a synchronization transmission period of a base station, and the demodulation unit 22 demodulates the received at least two pieces of SCH information. Because the user equipment may demodulate multiple pieces of SCH information in one synchronization transmission period, coverage of a synchronization channel for the user equipment can be enhanced. The received at least two pieces of SCH information are transmitted by the base station on a first common control channel and an extended control channel of the synchronization transmission period, the first common control channel is timeslot 0, and the extended control channel does not include timeslot 0. Before transmitting at least two pieces of SCH information, the base station needs to configure at least two SCH resources on a corresponding timeslot and a corresponding TDMA frame. The base station may configure the SCH resource in multiple manners. For a specific configuration process, refer to the description in S101 in the embodiment corresponding to the foregoing FIG. 2, and details are not described herein again.

In this embodiment of the present application, at least two pieces of SCH information are received in a synchronization transmission period of a base station, and the received at least two pieces of SCH information are demodulated, so that coverage of a synchronization channel for the user equipment can be enhanced.

Figure 10:
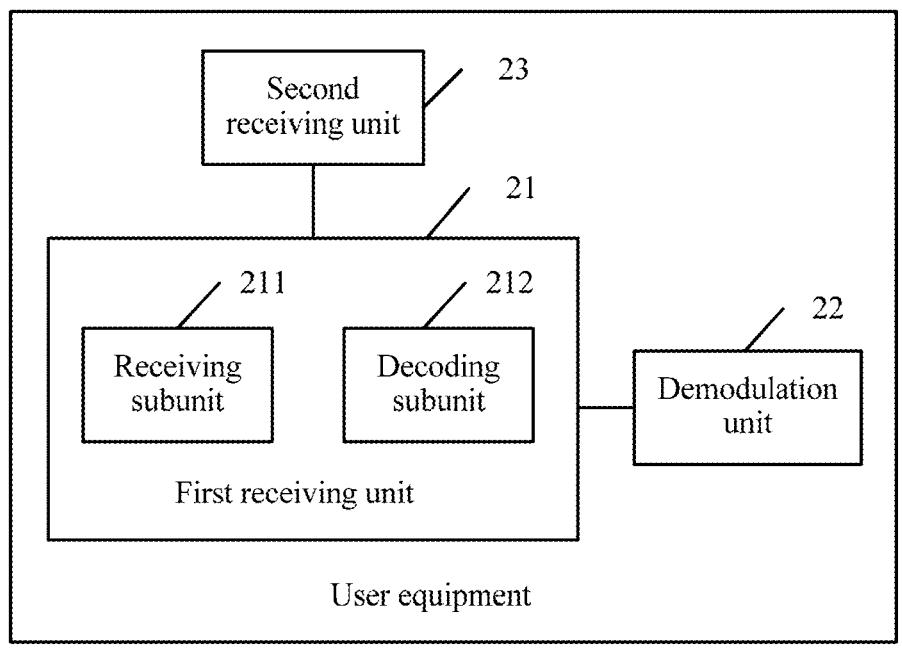
FIG. 10 is a schematic structural diagram of another user equipment according to an embodiment of the present application.

Refer to FIG. 10, which is a schematic structural diagram of another user equipment according to an embodiment of the present application. The user equipment may include: a first receiving unit 21, a second receiving unit 23, and a demodulation unit 22. The first receiving unit 21 includes: a receiving subunit 211 and a decoding subunit 212.

The second receiving unit 23 is configured to receive at least two pieces of FCCH information in a synchronization transmission period of the base station, and perform frequency correction by using the at least two pieces of FCCH information.

Specifically, the second receiving unit 23 may receive at least two pieces of FCCH information in the synchronization transmission period of the base station, and perform frequency correction by using the at least two pieces of FCCH information. Because the user equipment may receive multiple pieces of FCCH information in one synchronization transmission period, frequency synchronization duration of edge user equipment may be effectively reduced. The synchronization transmission period includes 10 or 11 TDMA frames, and each TDMA frame includes a total of 8 timeslots from timeslot 0 to timeslot 7. For a specific definition of the synchronization transmission period, refer to the synchronization transmission period in the 51-frame multiframe structural diagram corresponding to the foregoing FIG. 1.

The first receiving unit 21 includes:
the receiving subunit 211, configured to receive at least two pieces of coded SCH information in the synchronization transmission period of the base station after frequency correction is completed by using the received FCCH information; and
the decoding subunit 212, configured to decode the received at least two pieces of coded SCH information.

Specifically, after frequency correction is completed by using the received FCCH information, the receiving subunit 211 may receive at least two pieces of coded SCH information in a synchronization transmission period of a base station, and the decoding subunit 212 decodes the received at least two pieces of coded SCH information. The received at least two pieces of FCCH information and at least two pieces of coded SCH information are transmitted by the base station on a first common control channel and an extended control channel of the synchronization transmission period, the first common control channel is timeslot 0, and the extended control channel does not include timeslot 0. Before transmitting at least two pieces of FCCH information and at least two pieces of coded SCH information, the base station needs to configure at least two FCCH resources and at least two SCH resources on a corresponding timeslot and a corresponding TDMA frame. The base station may configure the FCCH resources and the SCH resources in multiple manners. For a specific configuration process, refer to the description in S201 and S202 in the embodiment corresponding to the foregoing FIG. 3, and details are not described herein again. The at least two pieces of coded SCH information are obtained by using the base station to perform coding on the SCH information according to timeslot numbers of the configured SCH resources. Because the user equipment receives multiple pieces of FCCH information in the synchronization transmission period, the user equipment cannot identify which timeslot is a TN0 timeslot in a received signal. In this case, the received at least two pieces of coded SCH information may be decoded by using the decoding subunit 212, so that the user equipment can learn when to begin to demodulate the decoded at least two pieces of coded SCH information. The base station performs coding on SCH information; that is, the base station performs scrambling on the SCH information by using a mask of a corresponding timeslot number. For a specific process in which the base station performs scrambling on the SCH information, refer to the description in the embodiment corresponding to the foregoing FIG. 4, and details are not described herein again. The decoding subunit 212 decodes the received at least two pieces of coded SCH information; that is, the decoding subunit 212 performs descrambling on the received at least two pieces of coded SCH information, so as to obtain the SCH information.

The demodulation unit 22 is specifically configured to demodulate the decoded at least two pieces of coded SCH information.

Specifically, the decoding subunit 212 performs descrambling on scrambled SCH information, so as to obtain the decoded at least two pieces of coded SCH information; and in this case, the demodulation unit 22 demodulates the decoded at least two pieces of coded SCH information, so that coverage of a synchronization channel for the user equipment can be enhanced.

In this embodiment of the present application, at least two pieces of FCCH information are received in a synchronization transmission period of the base station, so that frequency synchronization duration of edge user equipment can be effectively reduced; in addition, after frequency correction is completed by using the received FCCH information, at least two pieces of coded SCH information may be received in the synchronization transmission period of the base station, and the received at least two pieces of coded SCH information may be decoded, so as to demodulate decoded at least two pieces of coded SCH information, so that coverage of a synchronization channel for the user equipment can be enhanced.

An embodiment of the present application further provides a computer storage medium. The computer storage medium may store a program. When being executed, the program includes all or some of the steps of the method for transmitting a synchronization channel SCH as described in the method embodiments of the foregoing FIG. 2 to FIG. 4.

An embodiment of the present application further provides another computer storage medium. The computer storage medium may store a program. When being executed, the program includes all or some of the steps of the method for transmitting a synchronization channel SCH as described in the method embodiments of the foregoing FIG. 5 and FIG. 6.

Figure 11:
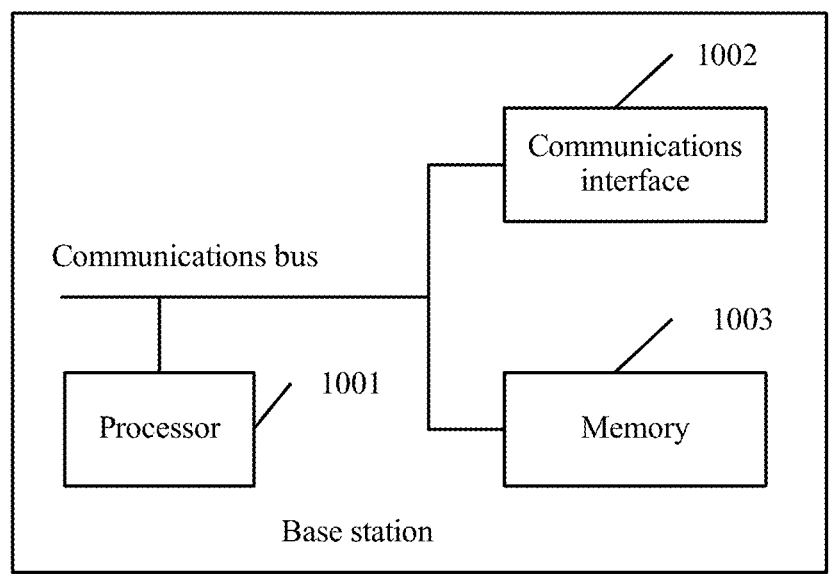
FIG. 11 is a schematic structural diagram of still another base station according to an embodiment of the present application.

Refer to FIG. 11, which is a schematic structural diagram of still another base station according to an embodiment of the present application. The base station may include a processor 1001, a communications interface 1002, and a memory 1003 (the base station may include one or more processors 1001, and one processor 1001 is used as an example in FIG. 11). In some embodiments of the present application, the processor 1001, the communications interface 1002, and the memory 1003 may be connected by using a communications bus or in another manner, and a communications bus connection is used as an example in FIG. 11.

The communications interface 1002 is configured to communicate with user equipment.

The memory 1003 is configured to store a program.

The processor 1001 is configured to execute the program, so as to implement:

configuring at least two SCH resources on a first common control channel and an extended control channel of a synchronization transmission period, where the synchronization transmission period includes 10 or 11 Time Division Multiple Access TDMA frames, each TDMA frame includes a total of 8 timeslots from timeslot 0 to timeslot 7, the first common control channel is timeslot 0, the extended control channel does not include timeslot 0, and each SCH resource is a timeslot of a TDMA frame; and transmitting at least two pieces of SCH information on the configured at least two SCH resources, where one piece of SCH information is transmitted on each SCH resource, and the at least two pieces of SCH information include same frame number information.

The extended control channel is a common control channel, and the extended control channel is one or more of timeslot 2, timeslot 4, or timeslot 6; and the configured at least two SCH resources are timeslot 0 of a second TDMA frame of the synchronization transmission period and one or more of timeslot 2, timeslot 4, or timeslot 6 of the second TDMA frame of the synchronization transmission period.

Alternatively, the extended control channel is a common control channel, and the extended control channel is one or more of timeslot 2, timeslot 4, or timeslot 6; and the configured at least two SCH resources are timeslot 0 of a second TDMA frame of the synchronization transmission period and one or more of timeslot 2, timeslot 4, or timeslot 6 of a first TDM frame and the second TDMA frame of the synchronization transmission period; where the configured at least two SCH resources further include: timeslot 1, timeslot 3, timeslot 5, or timeslot 7 of at least one TDMA frame of the synchronization transmission period.

Alternatively, the extended control channel is a non-common control channel, and the extended control channel is one or more of timeslot 1 to timeslot 7; and the configured at least two SCH resources include: timeslot 0 of a second TDMA frame of the synchronization transmission period and any one of timeslot 1 to timeslot 7 of at least one TDMA frame of the synchronization transmission period.

The processor 1001 is further configured to:

configure at least two frequency correction channel FCCH resources on the first common control channel and the extended control channel of the synchronization transmission period, where the FCCH resource is a timeslot of a TDMA frame; and transmit at least two pieces of FCCH information on the configured at least two FCCH resources; where the transmitting at least two pieces of SCH information on the configured at least two SCH resources includes:

performing coding on the SCH information according to a timeslot number of the SCH resource, and transmitting coded SCH information, where the coded SCH information includes timeslot number information approximately the SCH resource.

The processor 1001 is specifically configured to:

determine a mask of the timeslot number, where masks of different timeslot numbers are different from each other; and perform an exclusive OR operation on the mask of the timeslot number and a cyclic redundancy check code of the SCH information.

The processor 1001 is specifically configured to:

determine the at least two SCH resources according to a default configuration.

In this embodiment of the present application, multiple SCH resources are configured on a first common control channel and an extended control channel, so that coverage of a synchronization channel can be effectively enhanced. In addition, if multiple FCCH resources are also configured on the first common control channel and the extended control channel, frequency synchronization duration of an edge user may be reduced. In addition, if a CCCH channel is configured on timeslot 1 to timeslot 7, SCH information that needs to be repeatedly transmitted may be preferentially configured on the CCCH channel, so that a time-frequency resource on which a channel is configured can be fully used, and resource utilization is improved.

Figure 12:
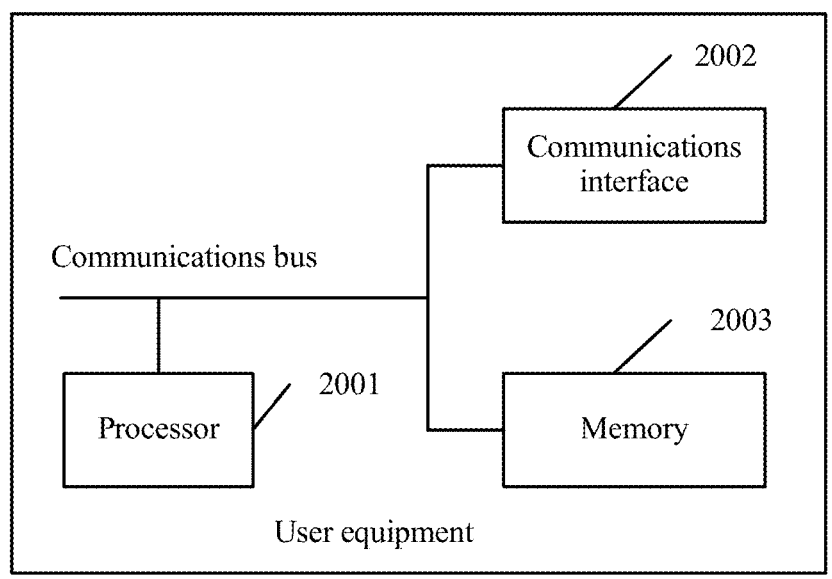
FIG. 12 is a schematic structural diagram of still another user equipment according to an embodiment of the present application.

Refer to FIG. 12, which is a schematic structural diagram of still another user equipment according to an embodiment of the present application. The user equipment may include a processor 2001, a communications interface 2002, and a memory 2003 (the user equipment may include one or more processors 2001, and one processor 2001 is used as an example in FIG. 12). In some embodiments of the present application, the processor 2001, the communications interface 2002, and the memory 2003 may be connected by using a communications bus or in another manner, and a communications bus connection is used as an example in FIG. 12.

The communications interface 2002 is configured to communicate with a base station.

The memory 2003 is configured to store a program.

The processor 2001 is configured to execute the program, so as to implement:

receiving at least two pieces of SCH information in a synchronization transmission period of the base station after frequency correction is completed by using received FCCH information; and demodulating the received at least two pieces of SCH information; where the synchronization transmission period includes 10 or 11 TDMA frames, and each TDMA frame includes a total of 8 timeslots from timeslot 0 to timeslot 7; and the received at least two pieces of SCH information are transmitted by the base station on a first common control channel and an extended control channel of the synchronization transmission period, the first common control channel is timeslot 0, and the extended control channel does not include timeslot 0.

The processor 2001 is further configured to:

receive at least two pieces of FCCH information in the synchronization transmission period of the base station, and perform frequency correction by using the at least two pieces of FCCH information; where the receiving at least two pieces of SCH information in a synchronization transmission period of the base station after frequency correction is completed by using received FCCH information includes:

receiving at least two pieces of coded SCH information in the synchronization transmission period of the base station after frequency correction is completed by using the received FCCH information; and decoding the received at least two pieces of coded SCH information, where the at least two pieces of coded SCH information are obtained by using the base station to perform coding on the SCH information according to the timeslot number of the configured SCH resource; where the demodulating the received at least two pieces of SCH information specifically includes: demodulating the decoded at least two pieces of coded SCH information.

In this embodiment of the present application, at least two pieces of FCCH information are received in a synchronization transmission period of the base station, so that frequency synchronization duration of edge user equipment can be effectively reduced; in addition, after frequency correction is completed by using the received FCCH information, at least two pieces of coded SCH information may be received in the synchronization transmission period of the base station, and the received at least two pieces of coded SCH information may be decoded, so as to demodulate decoded at least two pieces of coded SCH information, so that coverage of a synchronization channel for the user equipment can be enhanced.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely exemplary embodiments of the present application, and certainly is not intended to limit the protection scope of the present application. Therefore, equivalent variations made in accordance with the claims of the present application shall fall within the scope of the present application.

What is claimed is:

1. A base station, comprising:
a processor; and
a memory coupled with the processor;
wherein the processor is adapted to:
configure at least two synchronization channel (SCH) resources on a first common control channel and an extended control channel of a synchronization transmission period, wherein the synchronization transmission period comprises 10 or 11 Time Division Multiple Access (TDMA) frames, each TDMA frame comprises a total of 8 timeslots from timeslot 0 to timeslot 7, the first common control channel is timeslot 0, the extended control channel does not comprise timeslot 0, and each SCH resource is a timeslot of a TDMA frame; and
transmit at least two pieces of SCH information on the configured at least two SCH resources, wherein one piece of SCH information is transmitted on each SCH resource, and the at least two pieces of SCH information comprise same frame number information.

2. The base station according to claim 1, wherein:
the extended control channel is a common control channel, and the extended control channel is one or more of timeslot 2, timeslot 4, or timeslot 6; and
the at least two SCH resources are timeslot 0 of a second TDMA frame of the synchronization transmission period and one or more of timeslot 2, timeslot 4, or timeslot 6 of the second TDMA frame of the synchronization transmission period.

3. The base station according to claim 1, wherein:
the extended control channel is a common control channel, and the extended control channel is one or more of timeslot 2, timeslot 4, or timeslot 6; and
the at least two SCH resources are timeslot 0 of a second TDMA frame of the synchronization transmission period and one or more of timeslot 2, timeslot 4, or timeslot 6 of a first TDM frame and the second TDMA frame of the synchronization transmission period.

4. The base station according to claim 2, wherein:
the at least two SCH resources further comprise: timeslot 1, timeslot 3, timeslot 5, or timeslot 7 of at least one TDMA frame of the synchronization transmission period.

5. The base station according to claim 1, wherein:
the extended control channel is a non-common control channel, and the extended control channel is one or more of timeslot 1 to timeslot 7; and
the at least two SCH resources comprise: timeslot 0 of a second TDMA frame of the synchronization transmission period and any one of timeslot 1 to timeslot 7 of at least one TDMA frame of the synchronization transmission period.

6. The base station according to claim 1, wherein the processor is adapted to:
configure at least two frequency correction channel (FCCH) resources on the first common control channel and the extended control channel of the synchronization transmission period, wherein the FCCH resource is a timeslot of a TDMA frame; and
transmit at least two pieces of FCCH information on the configured at least two FCCH resources; perform coding on SCH information according to a timeslot number of an SCH resource; and
transmit coded SCH information, wherein the coded SCH information comprises timeslot number information approximately the SCH resource.

7. The base station according to claim 6, wherein the processor is adapted to:
determine a mask of a timeslot number, and perform an exclusive OR operation on the mask of the timeslot number and a cyclic redundancy check code of the SCH information; wherein
masks of different timeslot numbers are different from each other.

8. The base station according to claim 1, wherein the processor is adapted to:
determine the at least two SCH resources according to a default configuration.

9. User equipment, comprising:
a processor; and
a memory coupled with the processor;
wherein the processor is configured to:
receive at least two pieces of SCH information in a synchronization transmission period of a base station after frequency correction is completed by using received FCCH information; and
demodulate the received at least two pieces of SCH information; wherein
the synchronization transmission period comprises 10 or 11 TDMA frames, and each TDMA frame comprises a total of 8 timeslots from timeslot 0 to timeslot 7; and the received at least two pieces of SCH information are transmitted by the base station on a first common control channel and an extended control channel of the synchronization transmission period, the first common control channel is timeslot 0, and the extended control channel does not comprise timeslot 0.

10. The user equipment according to claim 9, wherein the processor is configured to:
receive at least two pieces of FCCH information in the synchronization transmission period of the base station, and perform frequency correction by using the at least two pieces of FCCH information; receive at least two pieces of coded SCH information in the synchronization transmission period of the base station after frequency correction is completed by using the received FCCH information; and
decode the received at least two pieces of coded SCH information;
demodulate the decoded at least two pieces of coded SCH information.

11. A method for transmitting a synchronization channel (SCH), comprising:
configuring at least two SCH resources on a first common control channel and an extended control channel of a synchronization transmission period, wherein the synchronization transmission period comprises 10 or 11 Time Division Multiple Access (TDMA) frames, each TDMA frame comprises a total of 8 timeslots from timeslot 0 to timeslot 7, the first common control channel is timeslot 0, the extended control channel does not comprise timeslot 0, and each SCH resource is a timeslot of a TDMA frame; and
transmitting at least two pieces of SCH information on the configured at least two SCH resources, wherein one piece of SCH information is transmitted on each SCH resource, and the at least two pieces of SCH information comprise same frame number information.

12. The method according to claim 11, wherein:
the extended control channel is a common control channel, and the extended control channel is one or more of timeslot 2, timeslot 4, or timeslot 6; and
the configured at least two SCH resources are timeslot 0 of a second TDMA frame of the synchronization transmission period and one or more of timeslot 2, timeslot 4, or timeslot 6 of the second TDMA frame of the synchronization transmission period.

13. The method according to claim 11, wherein:
the extended control channel is a common control channel, and the extended control channel is one or more of timeslot 2, timeslot 4, or timeslot 6; and
the configured at least two SCH resources are timeslot 0 of a second TDMA frame of the synchronization transmission period and one or more of timeslot 2, timeslot 4, or timeslot 6 of a first TDM frame and the second TDMA frame of the synchronization transmission period.

14. The method according to claim 12, wherein:
the configured at least two SCH resources further comprise: timeslot 1, timeslot 3, timeslot 5, or timeslot 7 of at least one TDMA frame of the synchronization transmission period.

15. The method according to claim 11, wherein:
the extended control channel is a non-common control channel, and the extended control channel is one or more of timeslot 1 to timeslot 7; and
the configured at least two SCH resources comprise: timeslot 0 of a second TDMA frame of the synchronization transmission period and any one of timeslot 1 to timeslot 7 of at least one TDMA frame of the synchronization transmission period.

16. The method according to claim 11, further comprising:
configuring at least two frequency correction channel (FCCH) resources on the first common control channel and the extended control channel of the synchronization transmission period, wherein the FCCH resource is a timeslot of a TDMA frame; and transmitting at least two pieces of FCCH information on the configured at least two FCCH resources; wherein
the transmitting at least two pieces of SCH information on the configured at least two SCH resources comprises:
performing coding on the SCH information according to a timeslot number of the SCH resource, and transmitting coded SCH information, wherein the coded SCH information comprises timeslot number information approximately the SCH resource.

17. The method according to claim 16, wherein the performing coding on the SCH information according to a timeslot number of the SCH resource comprises:
determining a mask of the timeslot number, wherein masks of different timeslot numbers are different from each other; and
performing an exclusive OR operation on the mask of the timeslot number and a cyclic redundancy check code of the SCH information.

18. The method according to claim 11, wherein the configuring at least two SCH resources on a first common control channel and an extended control channel of a synchronization transmission period comprises:
determining the at least two SCH resources according to a default configuration.

* * * * *